United States Patent
Hector, Jr. et al.

(10) Patent No.: US 11,795,901 B2
(45) Date of Patent: *Oct. 24, 2023

(54) PUMPED STORAGE WATER ELECTRIC POWER GENERATION FACILITIES

(71) Applicant: CARROLL HECTOR, LLC, Raleigh, NC (US)

(72) Inventors: Francis Norbert Hector, Jr., Raleigh, NC (US); Juan Keith Carroll, Littleton, NC (US)

(73) Assignee: CARROLL HECTOR, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,450

(22) Filed: Aug. 4, 2022

(65) Prior Publication Data
US 2022/0372946 A1    Nov. 24, 2022

Related U.S. Application Data

(60) Continuation of application No. 17/666,928, filed on Feb. 8, 2022, now Pat. No. 11,441,530, which is a
(Continued)

(51) Int. Cl.
*F03B 13/08* (2006.01)
*H02K 7/18* (2006.01)

(52) U.S. Cl.
CPC .......... *F03B 13/08* (2013.01); *H02K 7/1823* (2013.01)

(58) Field of Classification Search
CPC .............................. F03B 13/08; H02K 7/1823
See application file for complete search history.

(56) References Cited

U.S. PATENT DOCUMENTS

| 4,001,597 A | 1/1977 | Graff |
| 6,718,761 B2 | 4/2004 | Merswolke et al. |

(Continued)

FOREIGN PATENT DOCUMENTS

| CN | 202658586 | 1/2013 |
| CN | 104120901 | 10/2014 |

(Continued)

OTHER PUBLICATIONS

The International Bureau of WIPO, Notification Concerning Transmittal of International Preliminary Report on Patentability, dated Mar. 16, 2023, 5 pages.
(Continued)

*Primary Examiner* — Viet P Nguyen
(74) *Attorney, Agent, or Firm* — Shumaker, Loop & Kendrick, LLP; S. Alexander Long, Jr.

(57) ABSTRACT

A pumped storage electricity generating system that includes a water feed line for introducing water into a pressure vessel. Water flow valves communicate with the pressure vessel to control introduction of water into the pressure vessel. A push plate is mounted for movement in the pressure vessel. A single motor, for example, hydraulic radial piston motors, may be adapted for reciprocating the push plate linearly between a first direction wherein water is drawn into the pressure vessel through the water flow valves and a second direction wherein water is conveyed downstream through the water discharge line under pressure to the hydroelectric turbine. Other embodiments are double-acting and convey water to the turbine on each stroke.

19 Claims, 27 Drawing Sheets

Related U.S. Application Data continuation-in-part of application No. 17/404,209, filed on Aug. 17, 2021, now Pat. No. 11,280,312, which is a continuation-in-part of application No. 17/343,332, filed on Jun. 9, 2021, now Pat. No. 11,280,311, which is a continuation-in-part of application No. 17/316,429, filed on May 10, 2021, now abandoned, which is a continuation-in-part of application No. 17/013,070, filed on Sep. 4, 2020, now Pat. No. 11,053,910, which is a division of application No. 16/993,718, filed on Aug. 14, 2020, now Pat. No. 11,168,660, which is a division of application No. 16/713,359, filed on Dec. 13, 2019, now Pat. No. 10,781,787.

(60) Provisional application No. 62/779,686, filed on Dec. 14, 2018.

(56) References Cited

U.S. PATENT DOCUMENTS

| | | |
|---|---|---|
| 9,790,703 B1 | 10/2017 | Hector, Jr. et al. |
| 10,301,223 B2 | 5/2019 | Hector, Jr. et al. |
| 2005/0193729 A1 | 9/2005 | Vichakyothin et al. |
| 2008/0303282 A1 | 12/2008 | Ziegenfuss |
| 2009/0250934 A1 | 10/2009 | Bozano |
| 2009/0282822 A1 | 11/2009 | McBride et al. |
| 2009/0320459 A1 | 12/2009 | Frye |
| 2012/0061967 A1 | 3/2012 | Chaganti et al. |
| 2013/0154267 A1 | 6/2013 | Healy |
| 2014/0130497 A1 | 5/2014 | Anteau |
| 2014/0216022 A1 | 8/2014 | Jiang |
| 2015/0052885 A1 | 2/2015 | Meager |
| 2015/0113968 A1 | 4/2015 | Christensen |
| 2015/0275849 A1 | 10/2015 | Sieber et al. |
| 2017/0065908 A1 | 3/2017 | Charhut et al. |
| 2017/0204738 A1 | 7/2017 | Barakat |
| 2018/0180019 A1 | 6/2018 | Jiang et al. |
| 2019/0242357 A1 | 8/2019 | Mesinger et al. |
| 2019/0383260 A1* | 12/2019 | Frye .................... F03B 17/00 |
| 2020/0080531 A1 | 3/2020 | Hector, Jr. et al. |
| 2020/0080538 A1 | 3/2020 | Hector, Jr. et al. |

FOREIGN PATENT DOCUMENTS

| | | |
|---|---|---|
| CN | 104454304 B | 3/2015 |
| GB | 2553662 A | 3/2018 |
| IN | 201721045318 A | 4/2018 |

OTHER PUBLICATIONS

PCT International Search Report and Written Opinion for PCTUS2021041721, dated Sep. 20, 2021; 6 pages.
PCT International Search Report and Written Opinion for PCTUS2019050153, dated Nov. 12, 2019; 14 pages.
PCT International Search Report and Written Opinion for PCTUS2019066227, dated Apr. 16, 2020, 14 pages.

* cited by examiner

PUMPED STORAGE WATER ELECTRIC POWER GENERATION FACILITIES

CROSS REFERENCE TO RELATED APPLICATIONS

This utility patent application is a continuation of U.S. patent application Ser. No. 17/666,928, which is a continuation of U.S. patent application Ser. No. 17/404,209 filed on Feb. 8, 2022, which is a continuation-in-part of U.S. patent application Ser. No. 17/404,209, filed Aug. 17, 2021, which is a continuation-in-part of Ser. No. 17/343,332, filed Jun. 9, 2021, which is a continuation-in-part of U.S. patent application Ser. No. 17/316,429, filed May 10, 2021, which is a continuation-in-part of U.S. patent application Ser. No. 17/013,070, filed on Sep. 4, 2020, which is a divisional of U.S. patent application Ser. No. 16/993,718, filed on Aug. 14, 2020, which is a divisional of U.S. patent application Ser. No. 16/713,359, filed on Dec. 13, 2019, which claims priority from Provisional Patent Application Ser. No. 62/779,686, filed on Dec. 14, 2018, the contents of all of which are expressly incorporated by reference in this application.

TECHNICAL FIELD AND BACKGROUND OF THE INVENTION

This application relates to pumped storage water electric power generation facilities, the construction and use of pumped storage water reservoirs, the construction of such reservoirs utilizing Coal Combustion Residuals (referred to as "CCRs" throughout this application). CCRs, also referred to as "coal ash", is produced primarily from the burning of coal in coal-fired power plants, and several embodiments of power generation facilities utilizing novel techniques for generating electricity in pumped water storage facilities.

Coal ash includes a number of by-products produced from burning coal, including "fly ash", a very fine, powdery material composed mostly of silica made from the burning of finely ground coal in a boiler; "bottom ash", a coarse, angular ash particle that is too large to be carried up into the smoke stacks so it forms in the bottom of the coal furnace; "boiler slag", a molten bottom ash from slag tap and cyclone type furnaces that turns into pellets that have a smooth glassy appearance after it is cooled with water; and "flue gas desulfurization material", a material leftover from the process of reducing sulfur dioxide emissions from a coal-fired boiler that can be a wet sludge consisting of calcium sulfite or calcium sulfate or a dry powered material that is a mixture of sulfites and sulfates. Other types of residues include fluidized bed combustion ash, cenospheres, and scrubber residues. CCRs are disposed of or used in different ways depending on the type of by-product the processes at the plant and the regulations the power plant has to follow.

Some power plants dispose of CCRs in surface impoundments or in landfills, or recycle it into products like concrete or wallboard. CCRs are increasingly regulated to prevent or reduce environmental impact from various disposal methods. In many instances, CCRs must be converted to "beneficial uses" in a manner that does not pollute air, water or ground.

These regulatory requirements are increasingly interrelated with the trend of reducing the use of fossil fuels based on goals of reducing greenhouse gas emissions, and with the greater dependence on the use of renewable energy. Because of these factors, the need and demand for grid-scale long duration energy storage continues to increase and will likely increase at a greater rate in the future. The need for long duration energy storage facilities will continue to increase because renewable energy, for example, various tide, wind and solar technologies, often do not produce the energy when it is required. Periodic shortfalls in energy availability must therefore be backed up with available power from other sources not subject to the variability and interruptions inherent in most renewable energy technologies.

Energy storage is also in demand for continuous running base load plants that are fueled by nuclear and/or fossil fuels to allow for optimum efficiency in the use of these types of plants. While some embodiments of the apparatus according to this invention allow for electrical energy production without greenhouse gas emissions, there are also methods of generating grid-scale long-term energy storage and electrical production that are low in greenhouse gases per megawatt of electrical energy produced.

SUMMARY OF THE INVENTION

Therefore, there is an increasing need for long term energy storage facilities at the same time as an increasing need to control the manner in which CCRs are utilized so as to minimize environmental impacts from continuing production of CCR-type by-products of fossil fuel energy production. There is also the need for remediation of existing CCR ponds and landfills which are leaching constituents of concern into groundwater. These and other objects and advantages are achieved by providing a pumped storage electricity generating system that includes open loop, recirculating and closed looped capabilities.

According to another aspect of the invention, a pumped storage electricity generating system includes a pressure vessel, a water feed line for introducing water into the pressure vessel from a water source, a push plate for reciprocating movement within the pressure vessel, a first push plate driver adapted for moving the push plate within the pressure vessel in a first direction for generating water pressure within the pressure vessel, a second push plate driver adapted for moving the push plate in a second direction that is the reciprocal of the first direction for generating water pressure within the pressure vessel and a water outflow for conveying the water pressure generated in the pressure vessel to the hydroelectric turbine.

According to another aspect of the invention, a pressure vessel is provided containing a series of air dispersing plates that receives pressurized air through a series of spaced-apart air delivery feed tubes fed by a pressurized air delivery line, air flow valves communicating with the pressure vessel to control introduction of pressurized air into the pressure vessel through a plurality of air entry orifices and air exhaust orifices. A water feed line is provided for introducing water into the pressure vessel, and water flow valves communicate with the pressure vessel to control introduction of water into the pressure vessel. The pressurized air dispersed by the air dispersing plates is adapted to uniformly give up energy to the water in the pressure vessel. A water discharge line communicates with the pressure vessel for conveying water downstream under pressure to a hydroelectric turbine.

According to another aspect of the invention, the pressure vessel is adapted to work in an open loop, continuous cyclical manner during hydroelectric power generation.

According to another aspect of the invention, the pressure vessels are lower in elevation than the water source and located at a higher elevation than the hydroelectric turbine.

According to another aspect of the invention, the pressure vessels are positioned in a parallel/side-by-side array.

According to another aspect of the invention, the pressure vessels are positioned in a series/in-line array.

According to another aspect of the invention, the pump hydroelectric generation facility includes an upper reservoir, a feed water penstock that feeds water gravitationally from the upper reservoir to and through a power house that includes a hydroelectric turbine and into a lower reservoir.

According to another aspect of the invention, the upper reservoir and the lower reservoir are contained in respective upper and lower impoundments constructed of encapsulated CCR, reinforced CCR slopes and a covering of natural or synthetic vegetation.

According to another aspect of the invention, the upper and lower impoundments each include a base lined with an impervious liner and the reinforced CCR slopes are protected and reinforced by a roller compacted concrete berm encircling the respective upper and lower reservoirs.

According to another aspect of the invention, the push plate is mounted for movement in the pressure vessel between first and second winches adapted for reciprocating the push plate between a first direction wherein water is drawn into the pressure vessel and a second direction wherein water is conveyed downstream through the water discharge line under pressure to the hydroelectric turbine.

According to another aspect of the invention, the push plate is mounted for movement in the pressure vessel on a double-acting piston/cylinder assembly for reciprocating the push plate between a first direction wherein water is drawn into the pressure vessel and a second direction wherein water is conveyed downstream through the water discharge line under pressure to the hydroelectric turbine.

According to another aspect of the invention, the push plate is mounted for movement in the pressure vessel on a double-acting piston/cylinder assembly for reciprocating the push plate between a first direction wherein water is drawn into the pressure vessel and a second direction wherein water is conveyed downstream through the water discharge line under pressure to the hydroelectric turbine.

According to another aspect of the invention, the push plate is mounted for movement in the pressure vessel between first and second piston/cylinder assemblies adapted for reciprocating the push plate between a first direction wherein water is drawn into the pressure vessel and a second direction wherein water is conveyed downstream through the water discharge line under pressure to the hydroelectric turbine.

According to another aspect of the invention, the push plate includes friction-reducing rollers.

According to another aspect of the invention, a pumped storage electricity generating system is provided and includes a leak detection system that includes a primary leak detection zone constructed of an impervious liner, a geocomposite clay layer and a layer of encapsulated CCR, a drainage layer and a base.

According to another aspect of the invention, the pumped storage electricity generating system includes an upper reservoir and a feed water penstock that feeds water gravitationally from the upper reservoir to and through a power house that includes a hydroelectric turbine and into a lower reservoir.

According to another aspect of the invention, the upper reservoir is formed by a dam behind which is stored water to be transferred to the pressure vessel, the dam being constructed at least in part of CCR.

According to another aspect of the invention, the dam is constructed of CCR waste materials in combination with other construction materials and the sloped sides of the dam are protected from weather and erosion by materials selected from the group consisting of rip rap, stone and environmental fabrics.

According to another aspect of the invention, the base of the dam is constructed at least in part of CCR and is of a design selected from the group consisting of simple, slope-sided, core, diaphragm and sheet pile dams.

According to another aspect of the invention, a roller compacted concrete dam is constructed of multiple layers of compacted concrete formed in a stair step configuration and a secondary redundant dam with sloped sides constructed of CCR as a sole construction material.

According to another aspect of the invention, a pumped storage electricity generating system is provided that includes a water feed line for introducing water into a pressure vessel, water flow valves communicating with the pressure vessel to control introduction of water into the pressure vessel and a water discharge line for allowing water under pressure to exit the pressure vessel downstream to a hydroelectric turbine. A push plate is mounted for reciprocating movement in the pressure vessel between opposed first and second ends of the pressure vessel; and first and second motors are operatively connected to the push plate and adapted for reciprocating the push plate linearly between a first direction wherein water is drawn into the pressure vessel through the water flow valves and a second direction wherein water is conveyed downstream through the water discharge line under pressure to the hydroelectric turbine.

According to another aspect of the invention, the push plate is mounted for movement in the pressure vessel between first and second motors for reciprocating the push plate between a first direction wherein water is drawn into the pressure vessel by gravity or mechanical pumps and a second direction wherein water is conveyed downstream through the water discharge line under pressure to the hydroelectric turbine.

According to another aspect of the invention, the first and second motors are selected from the group consisting of a hydraulic piston motor, electric motor and air motor.

According to another aspect of the invention, the first and second motors are radial piston motors.

According to another aspect of the invention, the hydraulic piston motors include respective shafts rotatable by the hydraulic radial piston motors, and respective cables are connected to opposite sides of the push plate and are adapted to wind the cables onto and off of the shafts to thereby reciprocate movement of the push plate through the pressure vessel.

According to another aspect of the invention, wherein the hydraulic radial piston motors include respective shafts rotatable by the hydraulic piston motors, a single cable is connected to the push plate and the hydraulic radial piston motors, and the hydraulic piston motors are adapted to simultaneously wind the cable onto and off of the shafts to thereby reciprocate movement of the push plate through the pressure vessel.

According to another aspect of the invention, respective shafts are rotatable by the hydraulic radial piston motors and extend laterally through the pressure vessel to the exterior on opposite ends thereof. A cable is positioned in the pressure vessel, attached to the push plate and the respective hydraulic radial piston motors to reciprocate movement of the push plate in the pressure vessel, and first and second exterior cables are positioned on the respective shafts exterior to the pressure vessel. The hydraulic radial piston motors rotate the respective shafts in unison to move the push plate in the pressure vessel.

According to another aspect of the invention, the push plate is mounted for movement in the pressure vessel between first and second motors vertically positioned relative to each other proximate one end of the pressure vessel and third and fourth motors positioned relative to each other proximate an end of the pressure vessel opposite the one end of the pressure vessel for reciprocating the push plate between a first direction, wherein water is drawn into the pressure vessel by gravity or mechanical pumps and a second direction, wherein water is conveyed downstream through the water discharge line under pressure to the hydroelectric turbine.

According to another aspect of the invention, the pumped hydroelectric generation facility includes a reservoir, a feed water penstock that feeds water gravitationally from the reservoir to and through a power house that includes a hydroelectric turbine and thereafter returned into the reservoir for recirculation to the feed water penstock, thereby defining a closed loop pumped storage electricity generating system.

According to another aspect of the invention, the push plate includes a compartment in which a bogie carrying a wheel set is provided for reciprocating the push plate along a pair of parallel rails on which the bogie is positioned within the pressure vessel.

According to another aspect of the invention, a pumped storage electricity generating system is provided, and includes a water feed line for introducing water into a pressure vessel, water flow valves communicating with the pressure vessel to control introduction of water into the pressure vessel, and a water discharge line for allowing water under pressure to exit the pressure vessel downstream to a hydroelectric turbine. A push plate is mounted for reciprocating movement in the pressure vessel between opposed first and second ends of the pressure vessel. First and second motors are operatively connected to the push plate and adapted for reciprocating the push plate linearly between a first direction wherein water is drawn into the pressure vessel through the water flow valves. Third and fourth motors are operatively connected to the push plate and adapted for reciprocating the push plate linearly in a second direction wherein water is conveyed downstream through the water discharge line under pressure to the hydroelectric turbine.

According to another aspect of the invention, each of the first, second, third and fourth motors are positioned exterior to the pressure vessel and communicate with the push plate through shafts that extend into the pressure vessel on which the motors are mounted.

According to another aspect of the invention, the first, second, third and fourth motors are combustion motors and include intermediate apparatuses selected from the group consisting of gear boxes, hydraulic and pneumatic clutches.

According to another aspect of the invention, first and third motors drive the push plate in a first direction and second and fourth motors drive the push plate in a second direction.

According to another embodiment of the invention, only a single motor may be utilized to drive the push plate in first and in second direction. According to this embodiment, the invention is characterized by only the single motor for driving the push plate and therefore by a lack of additional motors for driving the push plate.

According to such an embodiment, the pumped storage electricity generating system may include a water feed line for introducing water into a pressure vessel, water flow valves communicating with the pressure vessel to control introduction of water into the pressure vessel, a water discharge line for allowing water under pressure to exit the pressure vessel downstream to a hydroelectric turbine, a push plate mounted for reciprocating movement in the pressure vessel between opposed first and second ends of the pressure vessel; and a single motor operatively connected to the push plate and adapted for reciprocating the push plate linearly between a first direction wherein water is drawn into the pressure vessel through the water flow valves and a second direction wherein water is conveyed downstream through the water discharge line under pressure to the hydroelectric turbine.

DETAILED DESCRIPTION OF PREFERRED EMBODIMENT AND BEST MODE

Figure 1:
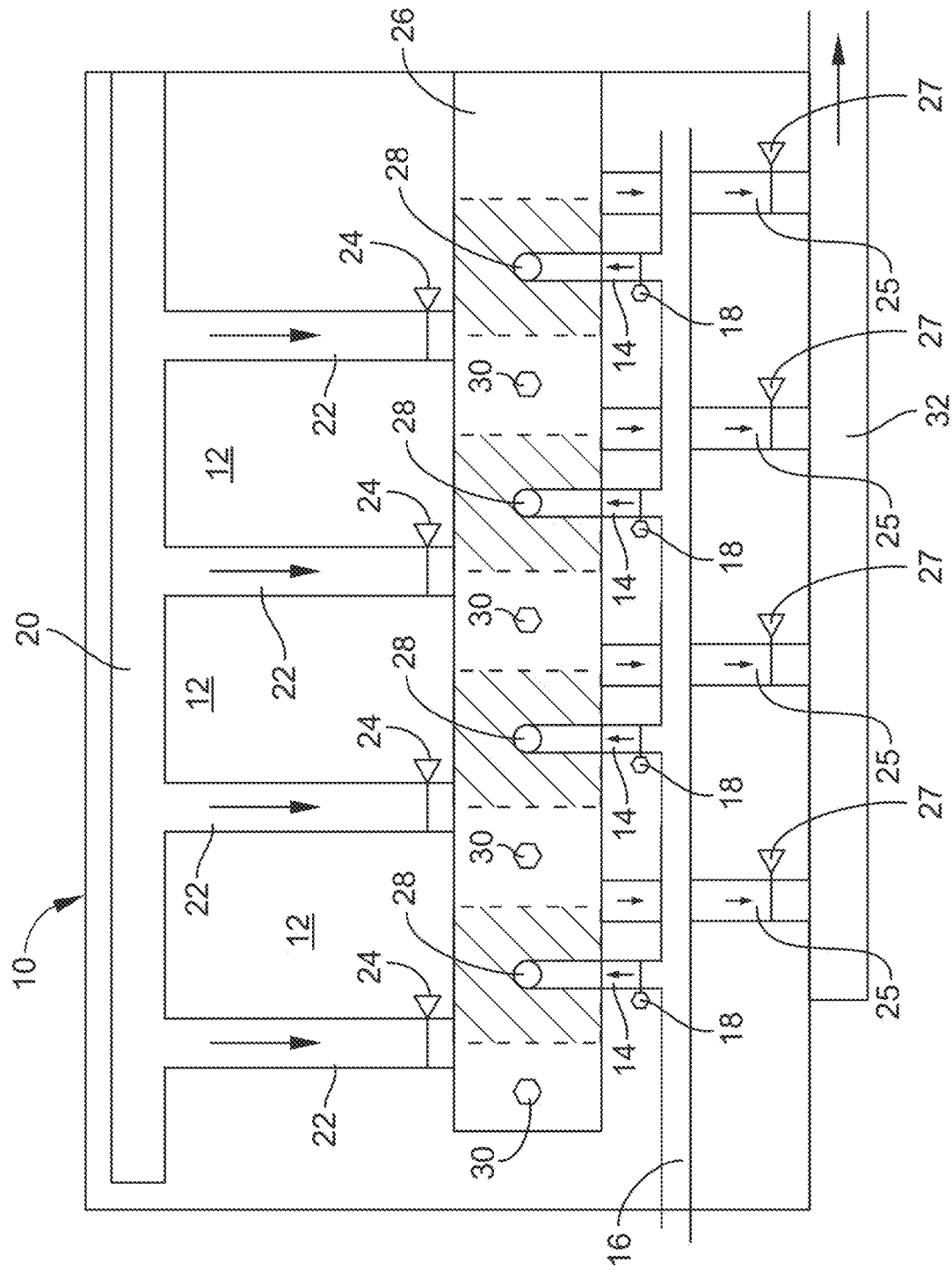
FIG. 1 is a top plan view of a pressure vessel according to an embodiment of the invention.
Figure 2:
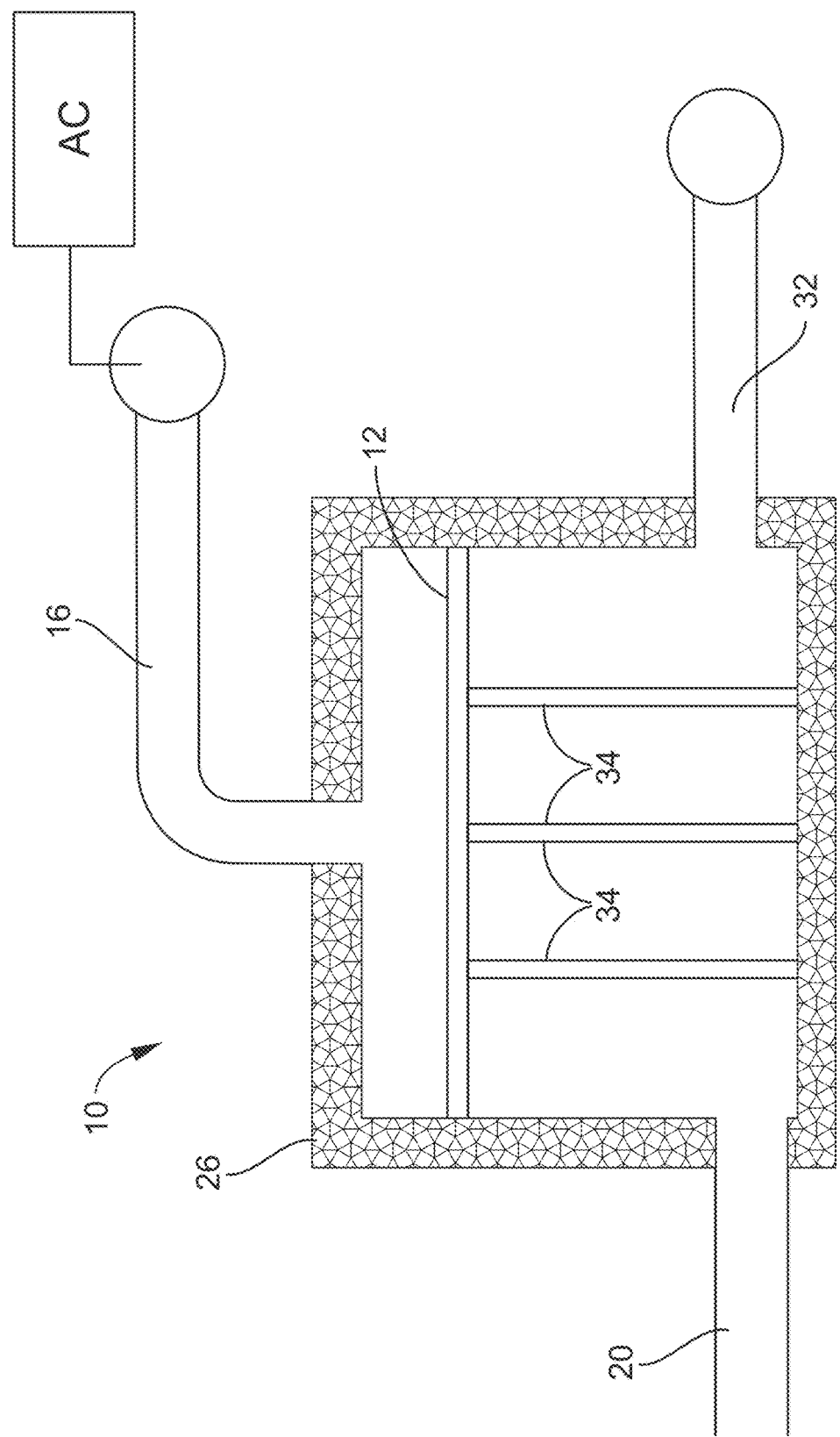
FIG. 2 is a vertical cross-section of the pressure vessel of FIG. 1.
Figure 3:
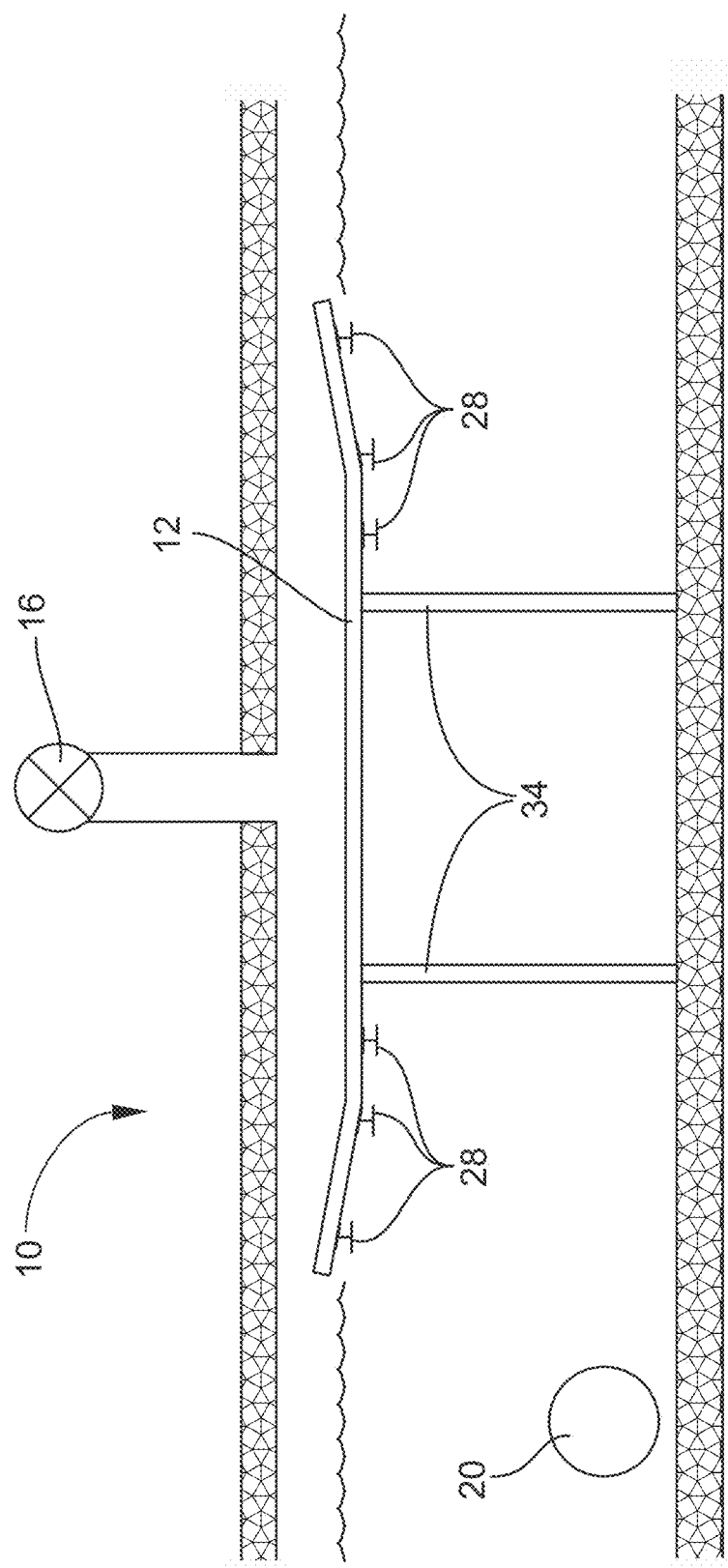
FIG. 3 is a vertical cross-section of FIG. 1 in a direction perpendicular to the cross-section of FIG. 2.

Referring now to the drawings, FIGS. 1, 2 and 3 illustrate one preferred embodiment of a pumped storage water FIGS. 1 and 2 are top plan, and vertical cross-section views of a pressure vessel 26 used to pressurize water that is then delivered downstream to a hydroelectric turbine. The pressure vessel system 10 includes a pressure vessel 26 that is constructed of suitable pressure-resistant materials, which may include high-strength metals in combination with other non-metallic reinforcing materials.

The pressure vessel 26, as is the case with the other embodiments of the pressure vessel disclosed in this application, may be any suitable cross-section.

The pressure vessel 26 contains a series of air dispersing plates 12 that receive air pressurized by an air compressor/ pressurized air storage tank "AC", see FIG. 1, through a series of spaced-apart air delivery feed tubes 14 fed by a pressurized air delivery line 16 from the air compressor "AC". Air flow into the pressure vessel 26 is controlled by air flow valves 18. Water to be pressurized is fed into the pressure vessel 26 through a water feed line 20 that branches into a series of water feed tubes 22. Water flow into the pressure vessel 26 is controlled by a series of water flow valves 24. Air is fed from the pressurized air delivery feed tubes 14 through air entry orifices 28 into the pressure vessel 26 and exits the pressure vessel 26 through air exhaust orifices 30. The pressurized air dispersed by the air dispersing plates 12 uniformly gives up its energy to the water in the pressure vessel 26, which is forced out of the pressure vessel 26 through discharge feed lines 25 and valves 27 and into a pressured water discharge line 32 and conveyed downstream under pressure to a hydroelectric turbine. As best shown in FIGS. 2 and 3, the dispersal of the air laterally results in pressure being applied to the water, which is at the same or similar level as the air dispersing plates 12 at the start of the discharge cycle.

The air dispersing plates 12 are stationary and disperse/ diffuse air under pressure to travel horizontally across the surface of the water in the pressure vessel 26 in lieu of jetting downward into the water. The stationary air dispersing plates 12 are less expensive than the cost of construction of a horizontal plate, which travels vertically up and down inside of pressure vessel to pressurize the water. Another advantage is the decreased cost of maintenance of the fixed air dispersing plates 12. The stationary air dispersing plates 12 are supported by spaced-apart structural supports 34. See FIGS. 2 and 3.

Figure 4:
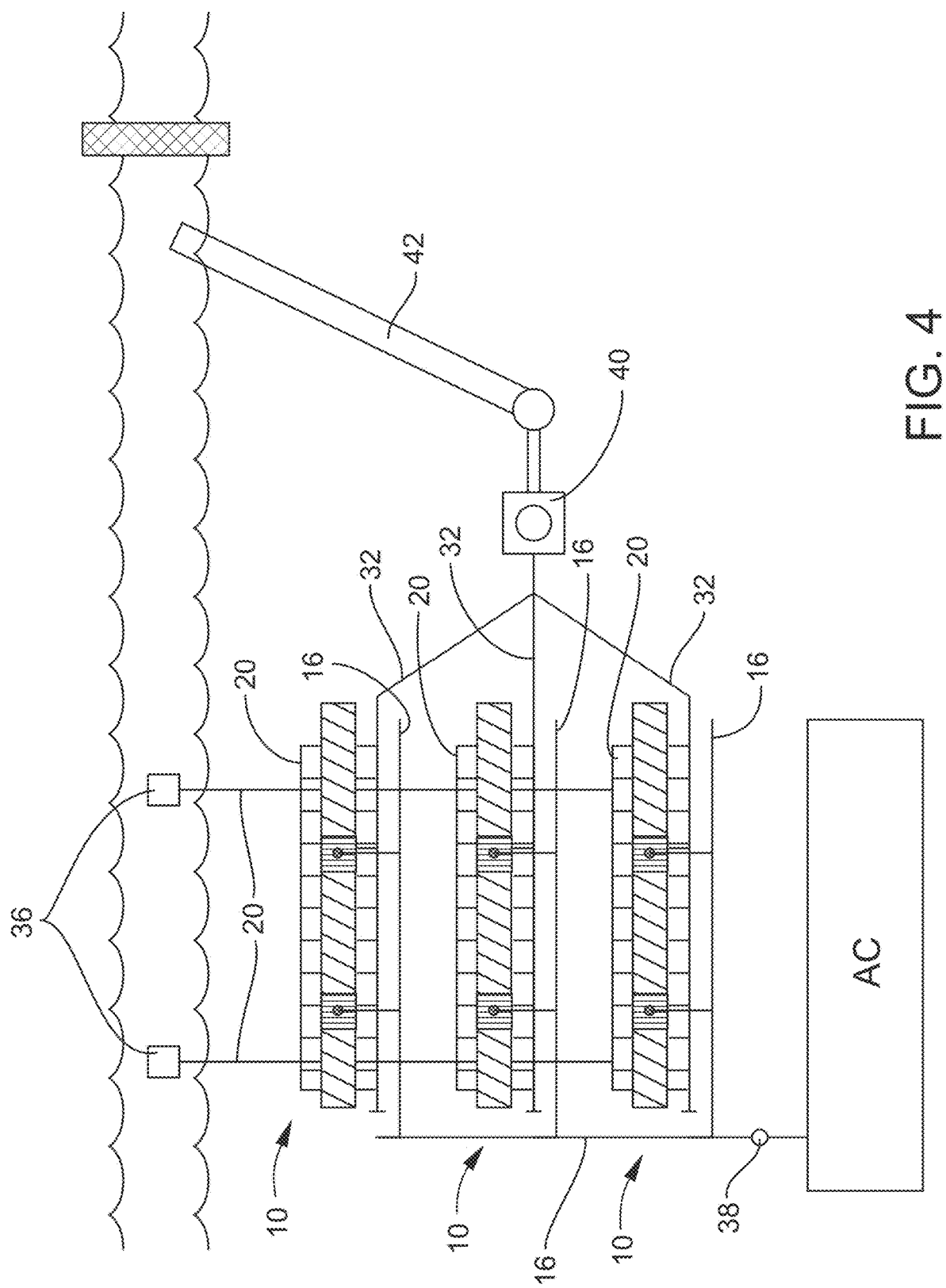
FIG. 4 is a top view of a circulating system that uses three pressure vessels that contain fixed air dispersing plates.

Referring now to FIG. 4, a top plan view is shown of a closed-loop circulating system that uses three pressure vessels 10 that contain fixed air dispersing plates 12, as described above. The pressure vessels 10 reside in a parallel/ side-by-side layout, as shown, but may also be placed in series/in-line relationship to each other. In FIG. 4, water is taken into the pressure vessels 10 through intake structures 36, which may be gravity feed or mechanical pumps, from an upstream water source such as a river, as shown, or from a natural or manmade lake, impoundment or other water source and delivered into the pressure vessels 10 through the water feed lines 20. Air pressure is controlled by an air pressure regulator 38. Pressurized water rotates the hydroelectric turbine 40 and the water, exhausted of its energy, flows under gravitational influence through a water return conduit 42 and back into the water source. If dammed, as shown, the system is effectively a closed-loop system since the exhausted water is returned to the same source as where the upstream water is being taken from the water source and delivered to the pressure vessel 26.

While only one pressure vessel 26 is shown in FIGS. 1 and 2, in practice a plurality of pressure vessels 10 will operate together in a staged sequence whereby pressurized water is always being sent to the hydroelectric turbine by an operation of at least one of the pressure vessels 10, while the other pressure vessels 10 are in different stages of operation, as shown in FIG. 3.

As an alternative to the arrangement of FIGS. 1-4, pneumatic cylinder pistons and hydro-pneumatic cylinder pistons can be used as the main piston for the apparatus in this invention in this application or they can be used as the piston(s) for the reuse of piston air as described below. These pistons can also use a parasitic load to run a hydraulic pump to increase the pressure with fluids if required.

Figure 5:
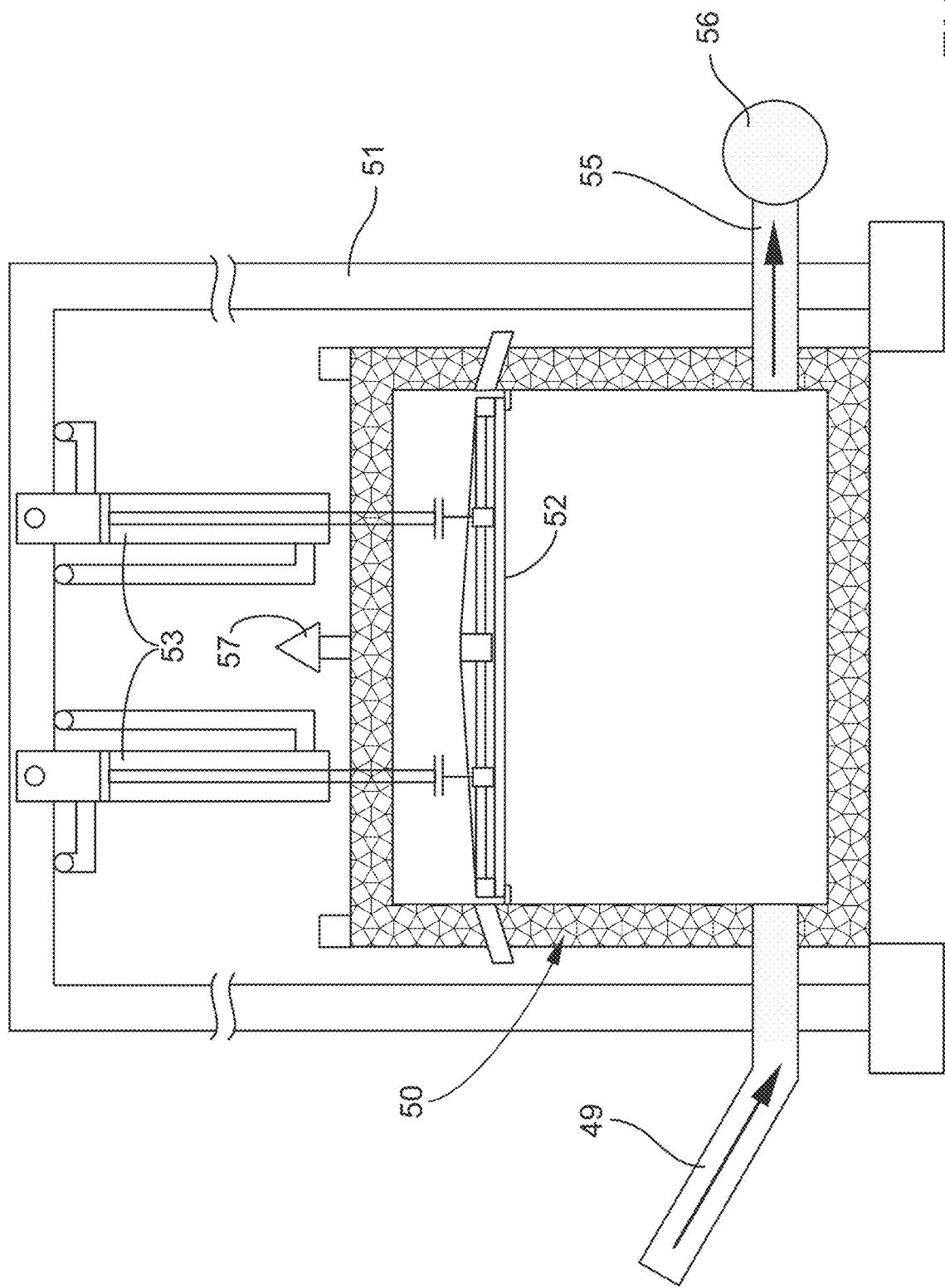
FIG. 5 is a cross-section of a pressure vessel that uses hydraulic cylinders to pressurize water contained inside of a pressure vessel.
Figure 6:
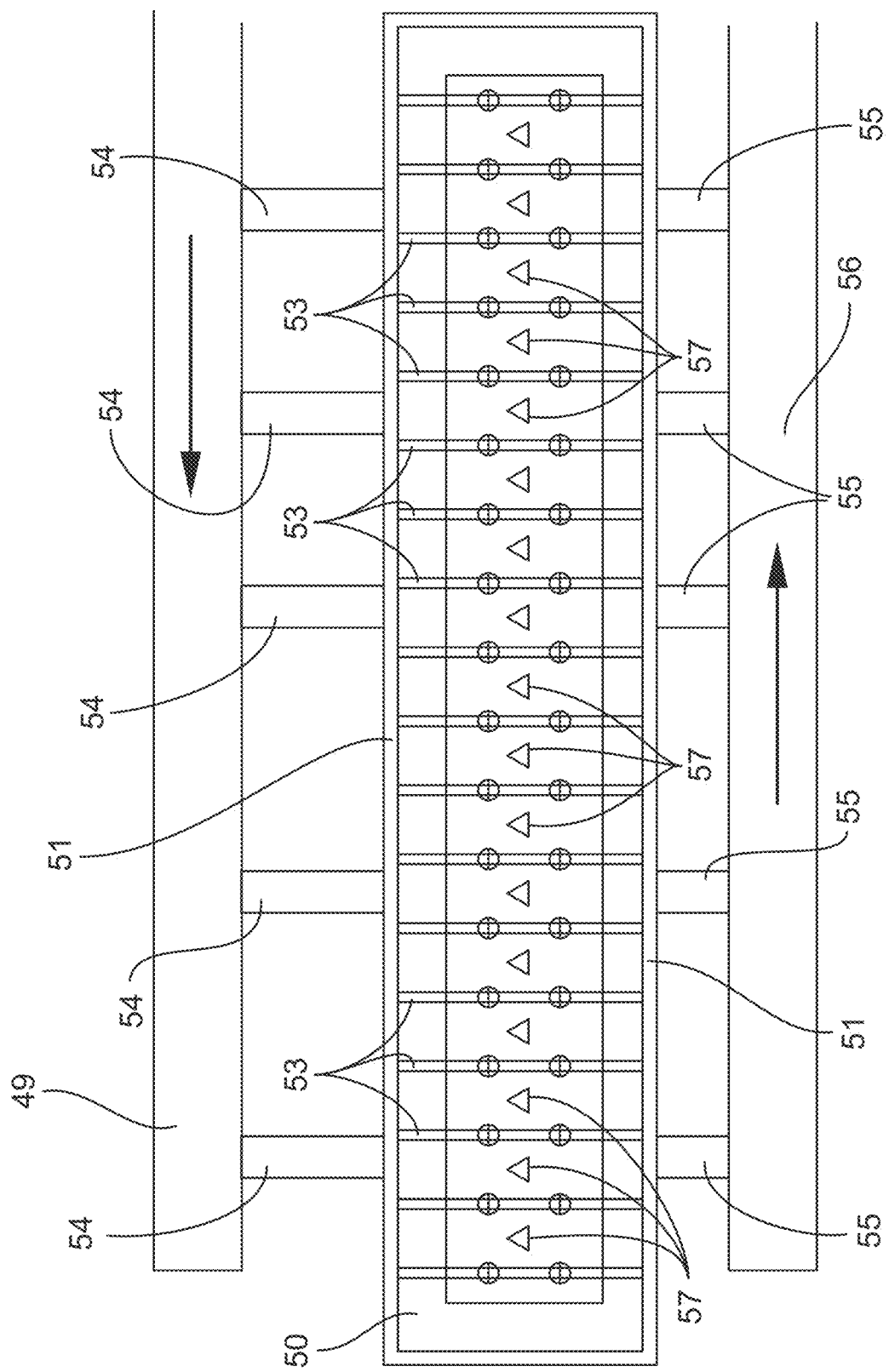
FIG. 6 is a top plan view of the pressure vessel of FIG. 5.

Referring now to FIGS. 5 and 6, a pressure vessel 50 that uses hydraulic cylinders to apply pressure upon water inside of the pressure vessel is shown. The pressure vessel 50 is supported within a support structure 51, which includes a foundation.

Although FIGS. 5 and 6 show structural supports that are each two cylinders wide, there may be one to many cylinders at each structural support location. A push plate 52 is mounted for reciprocating movement in the pressure vessel 50. Reciprocation of the push plate 52 occurs by operation of piston/cylinder assemblies 53 that are mounted on the support structure 51 and attached to the push plate 52. The piston/cylinder assemblies 53, which include double-acting lines, act as "drivers" and may be hydraulically or pneumatically powered, or air actuators may be used. Water enters the pressure vessel 50 thorough a valved water refill line 49 and is forced by pressure applied by the push plate 52 through a valved penstock water discharge line 55 to a downstream hydroelectric turbine via the penstock 56.

While only one pressure vessel 50 is shown, in practice a plurality of pressure vessels 50 will operate together in a staged sequence whereby pressurized water is always being sent to the hydroelectric turbine by at operation of at least one of the pressure vessels 50, while the other pressure vessels 50 are in different stages of operation.

The hydraulic cylinders 53 and push plate 52, as shown in FIGS. 5 and 6, can be re-configured in many different ways to push water from the sides or bottom of the pressure vessel 50. Hydraulic cylinders 53 can also be configured to pull the water toward the penstock, acting as a driver to pressurize the water, while the double acting hydraulic cylinders 53 are in the retracting mode of operation. Having the hydraulic cylinders configured to push or pull water from the side(s)

of the pressure vessel 50 will allow for the simple collection of hydraulic fluid in the event of a hydraulic oil leak from defectives seals, lines, or cylinders. Air is vented from the pressure vessel 50 through air vents 57.

To remove possible concerns of governmental permitting authorities, governmental oversight, and inspection departments and/or agencies, along with environmental groups, a hydraulic pump can also be used to pressurize water in the pressure vessel 50 by using one or more hydraulically operated winches acting as drivers to push water toward the penstock as described in further detail below. This method keeps the hydraulic oil at a greater distance from the water inside the pressure vessel 50 as compared to the hydraulic cylinders 53 shown in FIG. 5 and FIG. 6. The winch embodiment inherently adds environmental safety features in case of the unintentional mixing of hydraulic oil with the water inside the pressure vessels. The mechanical advantage of using modern hydraulic pumps and winches can be further increased by using pulleys (block and tackle system) to increase the amount of pressure that can be exerted upon the water inside the pressure vessels as the water is pushed toward the penstock.

When pneumatic cylinders or air actuators are used in lieu of hydraulic cylinders, the pressurized air, which is released after the push plate 52 has been used to discharge the water from the pressure vessel 50, can be reused to engage a cylinder 53 to retract the push plate 52 to its upper elevation to allow for the faster refilling of the pressure vessel 50 with water.

Figure 7:
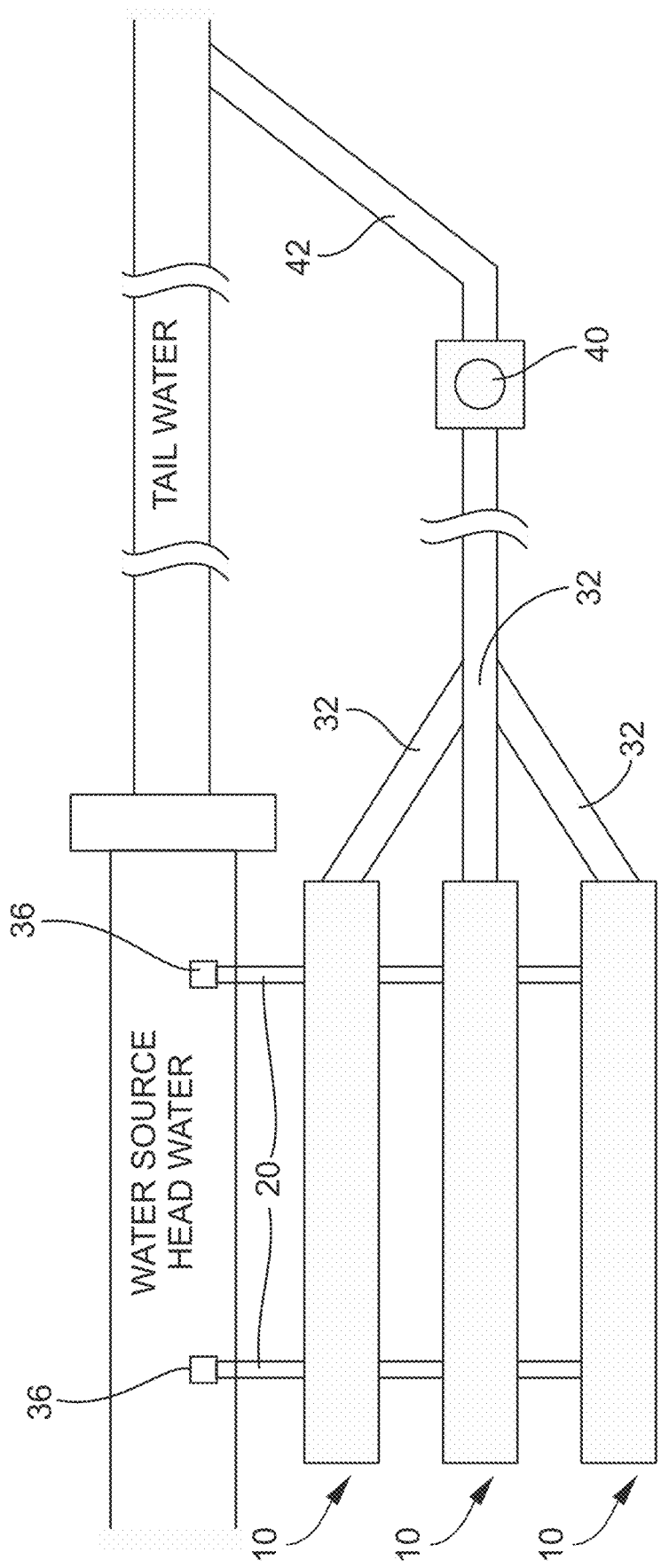
FIG. 7 is a top schematic view of a preferred embodiment of three pressure vessels that work in a continuous cyclical operation.
Figure 8:
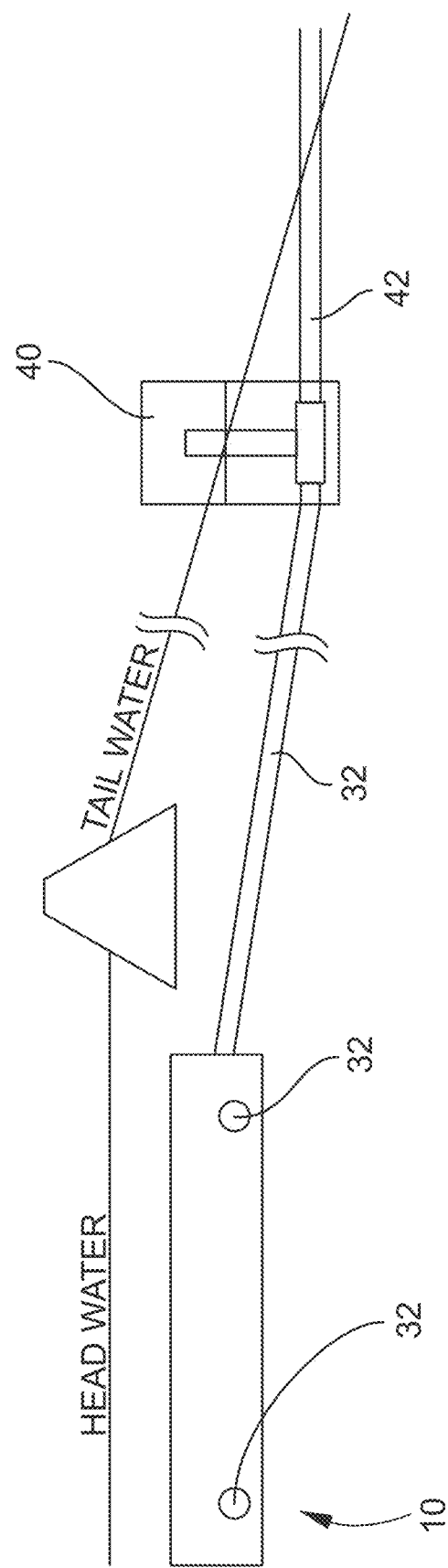
FIG. 8 is a schematic side elevation cross-section of the pressure vessels of FIG. 7.

Referring to FIGS. 7 and 8, a preferred embodiment of three pressure vessels 10 that work in an open loop, continuous cyclical fashion during the hydroelectric power generation is shown. The pressure vessels may be the pressure vessels 10 of FIGS. 1-4, as indicated, or the pressure vessels 50 of FIGS. 5 and 6. The pressure vessel 26 and water intakes 36 are lower in elevation than the water source and located at a higher elevation of the hydroelectric turbine 40.

FIG. 7 shows the pressure vessels 10 in a parallel/side-by-side layout, but these pressure vessels 10 can also be placed in series/in-line to each other if the site conditions warrant. Pressurized water discharge lines 32 convey water to the hydroelectric turbine 40. Water is returned to the water source by the water return conduit 42 to a tail water area downstream of, for example, a dam so that the system is an open loop system.

FIG. 8 shows a schematic side view cross-section of FIG. 7. This preferred embodiment can be used with any of the pressure vessel types disclosed in this invention. The pressure vessels 10 configuration, as shown in FIGS. 7 and 8, can be revised so that the hydroelectric turbine is higher in elevation than the pressure vessels. When the apparatus of this invention is constructed near the coast, this configuration will allow for protection from water surges as occurs during hurricanes and/or storms. The pressure vessels 10 in this configuration can be refilled by pumps or constructed at an elevation lower than the top of the water elevation.

Figure 9:
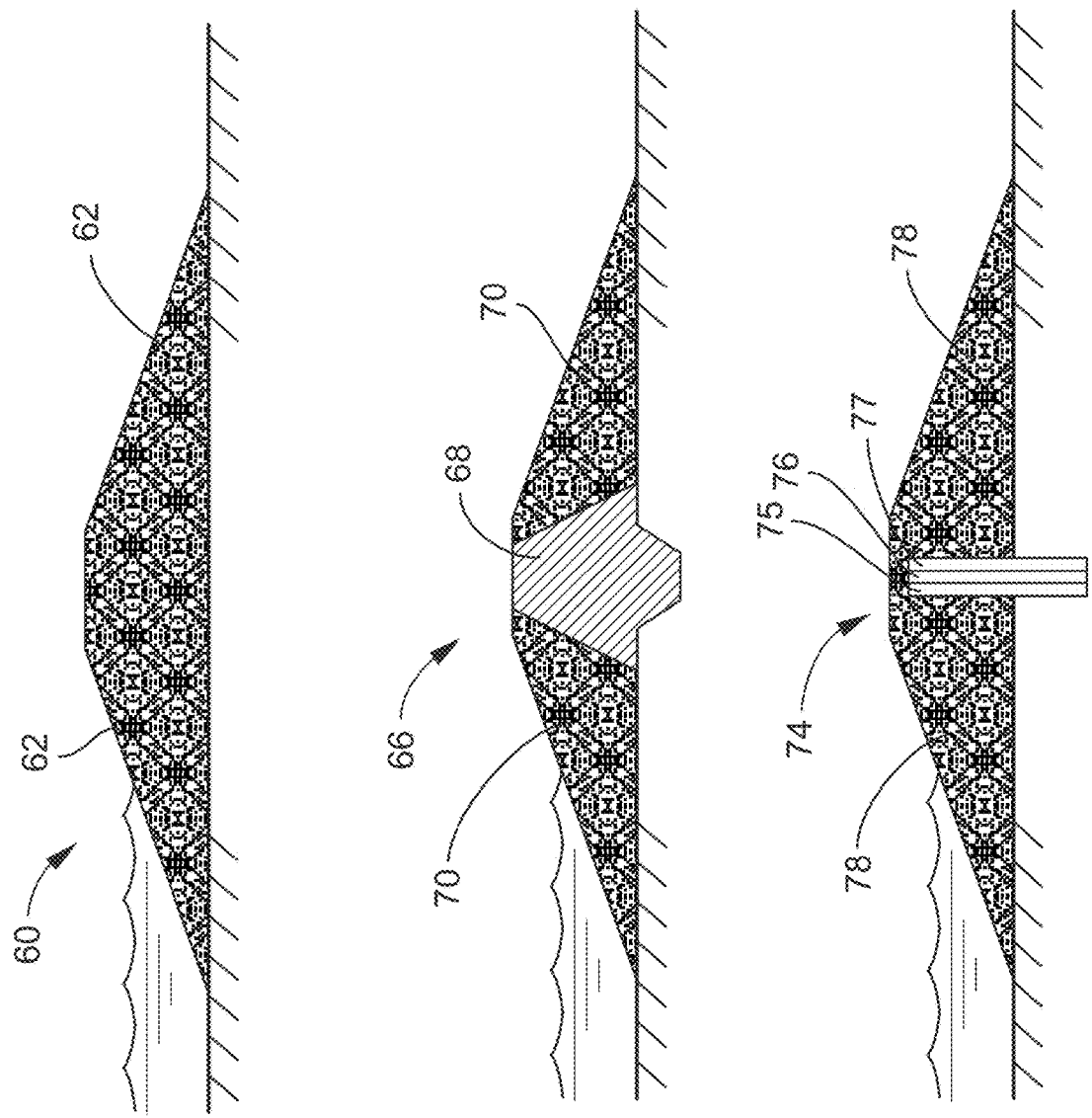
FIG. 9 shows side elevations of simple, core and diaphragm earthen dams.

Referring now to FIG. 9, three types of dams 60, 66 and 74 are shown that can be used for the construction of a reservoir/water impoundments disclosed in this application. Dam 60 is a "simple" dam that includes sloped sides 62 constructed according to known civil engineering principles and requirements.

Dam 66 is a "core" dam constructed according to known civil engineering principles and requirements and includes a reinforcing "core" 68 that is anchored below grade to provide resistance against lateral shifting of the sloped sides 70.

Dam 74 is a "diaphragm" dam constructed according to known civil engineering principles and requirements and includes reinforcing diaphragms 75, 76 and 77 that are anchored below grade to provide resistance against lateral shifting of the sloped sides 78.

Dams 60, 66 and 74 may include or consist of construction materials such as earth of various types, or earth intermixed with other materials such as stone and other aggregates. For purposes of this application the dams 60, 66 and 74 are preferably constructed beneficially using CCR waste materials in combination with other construction materials such as earth.

Figure 10:
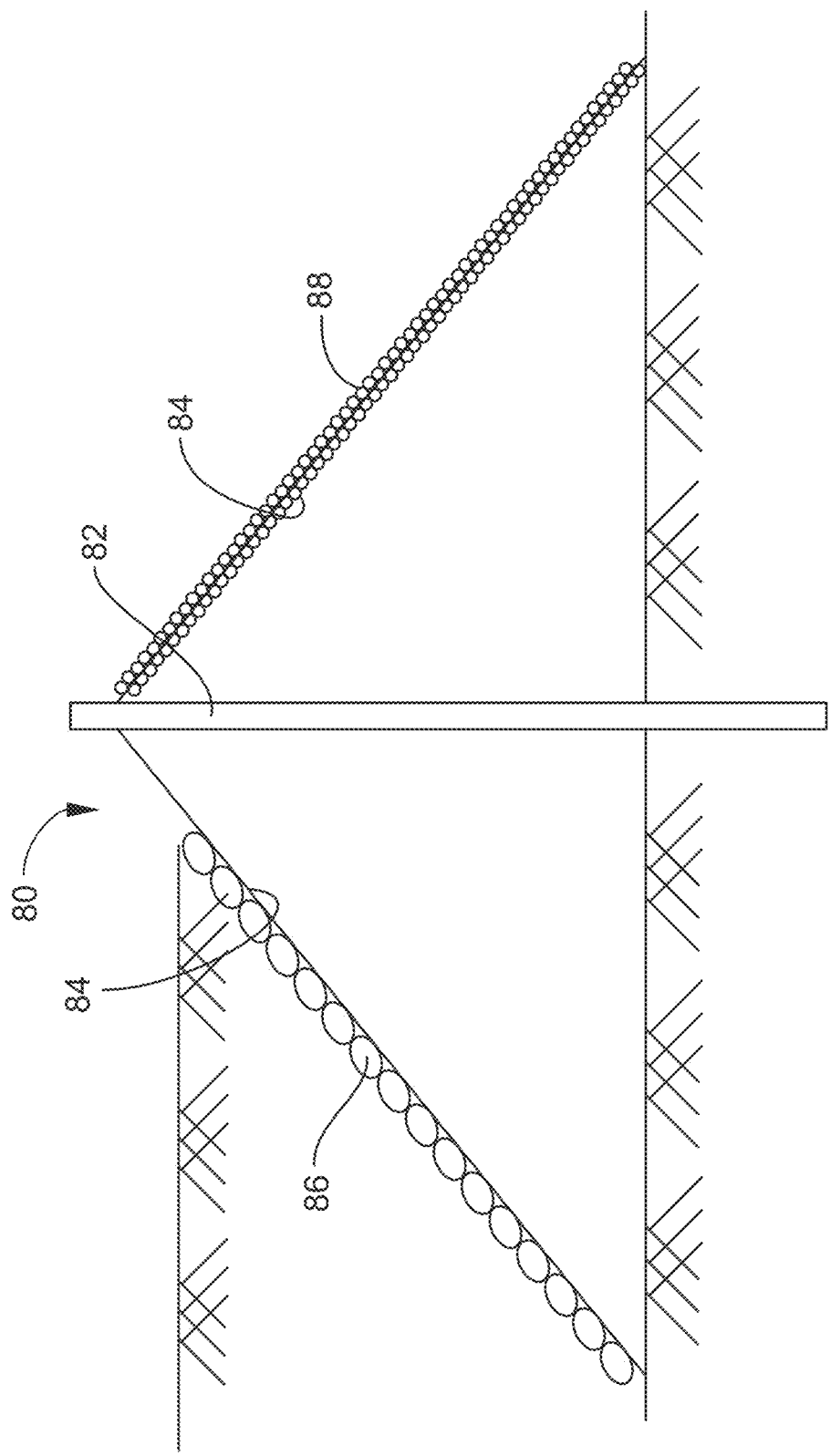
FIG. 10 is a cross section of one embodiment of a dam constructed using sheet piling.

FIG. 10 illustrates a dam 80 in cross-section constructed using sheet piling 82 as a central reinforcement. As with the dams in FIG. 9, dam 80 is preferably constructed beneficially using CCR waste materials in combination with other construction materials such as earth. The sloped sides 84 are protected from weather and erosion by rip rap 86 and/or stone 88. While not shown, environmental fabrics or suitable type can be used under the rip rap 86 or stone 88 for further protection.

Figure 11:
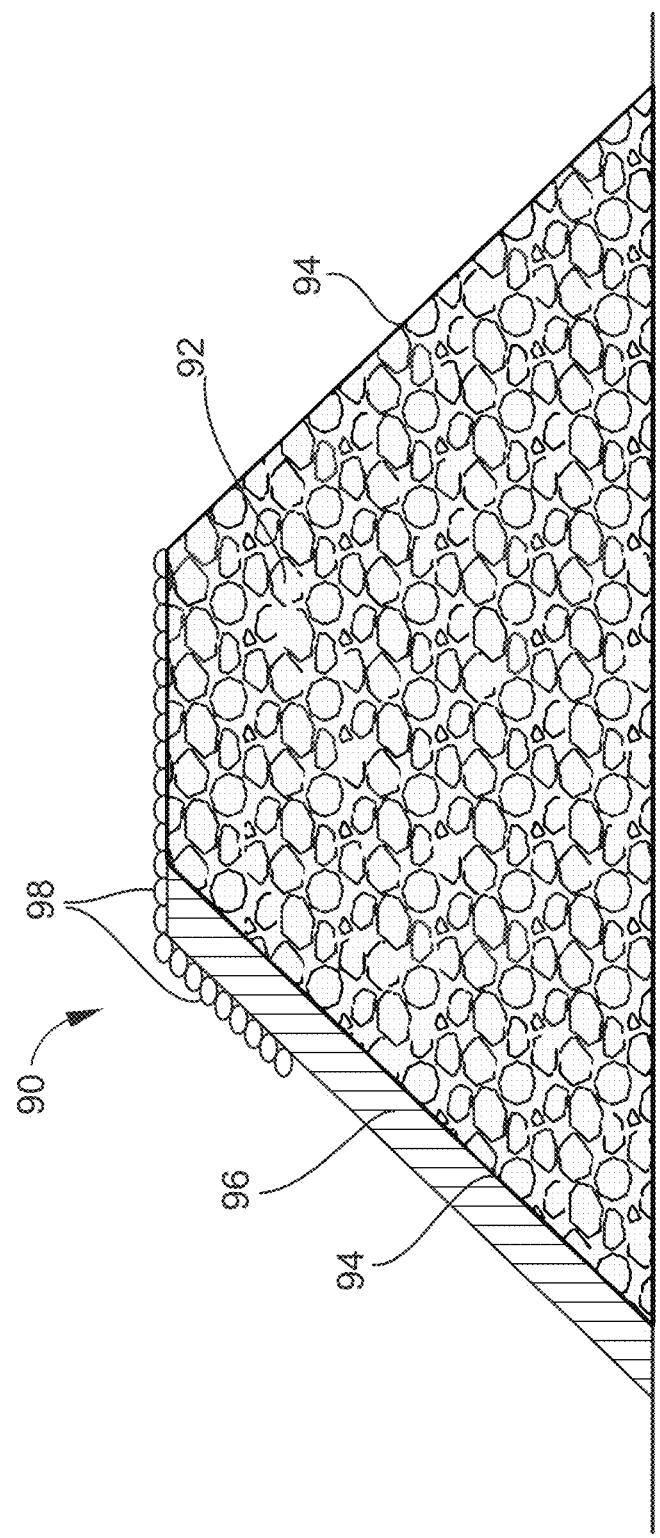
FIG. 11 is a cross-section of one embodiment of a dam constructed using rock fill.

Referring to FIG. 11, yet another dam 90 is shown in cross-section as illustrative of several different possible types of dams constructed with rock fill 92 and defines slopes 94. In the example illustrated, the rock fill 92 is covered with an impervious membrane 96, which in turn is covered with a protective covering of rip rap 98.

Figure 12:
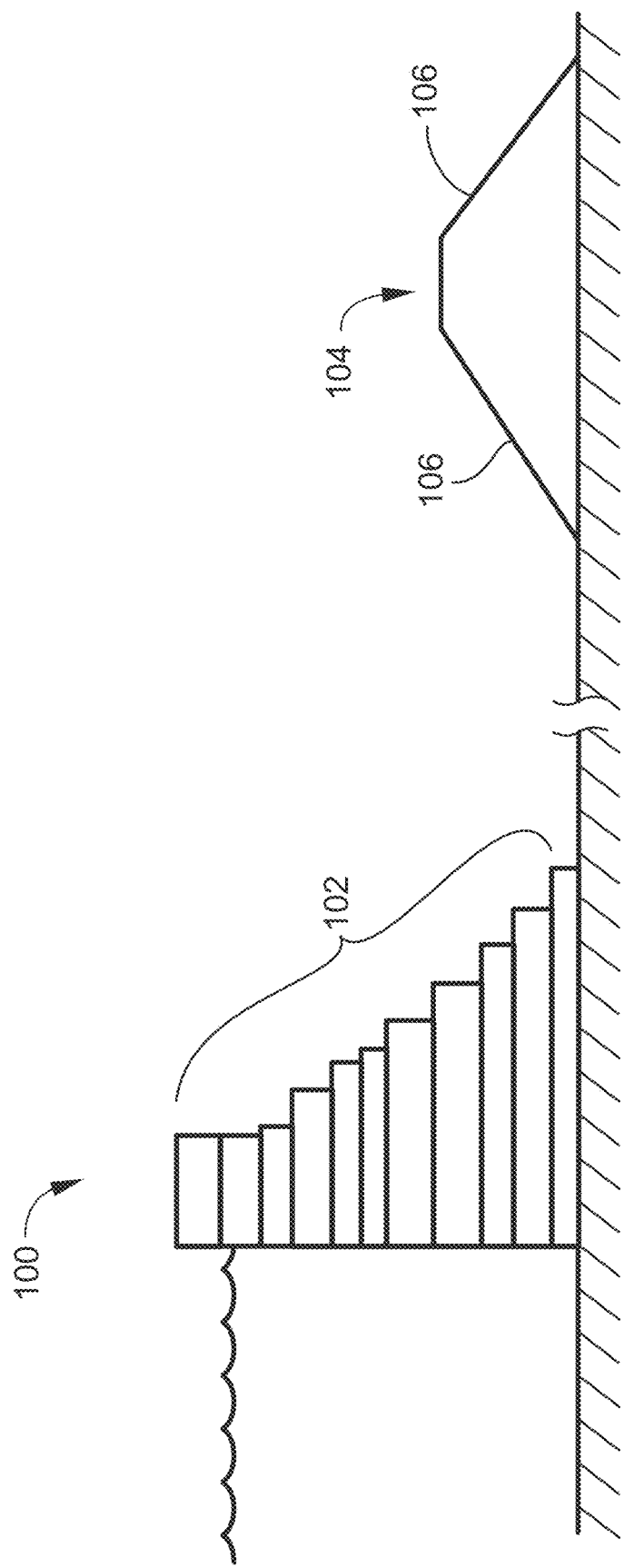
FIG. 12 is a side elevation of a roller compacted concrete dam, with a secondary/redundant dam for safety constructed out of earthen materials.

Referring to FIG. 12, a roller compacted concrete dam 100 is shown, and includes multiple layers 102 of roller compacted concrete formed in a stair step configuration. A secondary/redundant dam 104 with sloped sides 106 for safety constructed out of materials, which may include CCR either as a sole construction material, with other materials such as rock, sand, binders and earth, or earth as a sole material.

Figure 13:
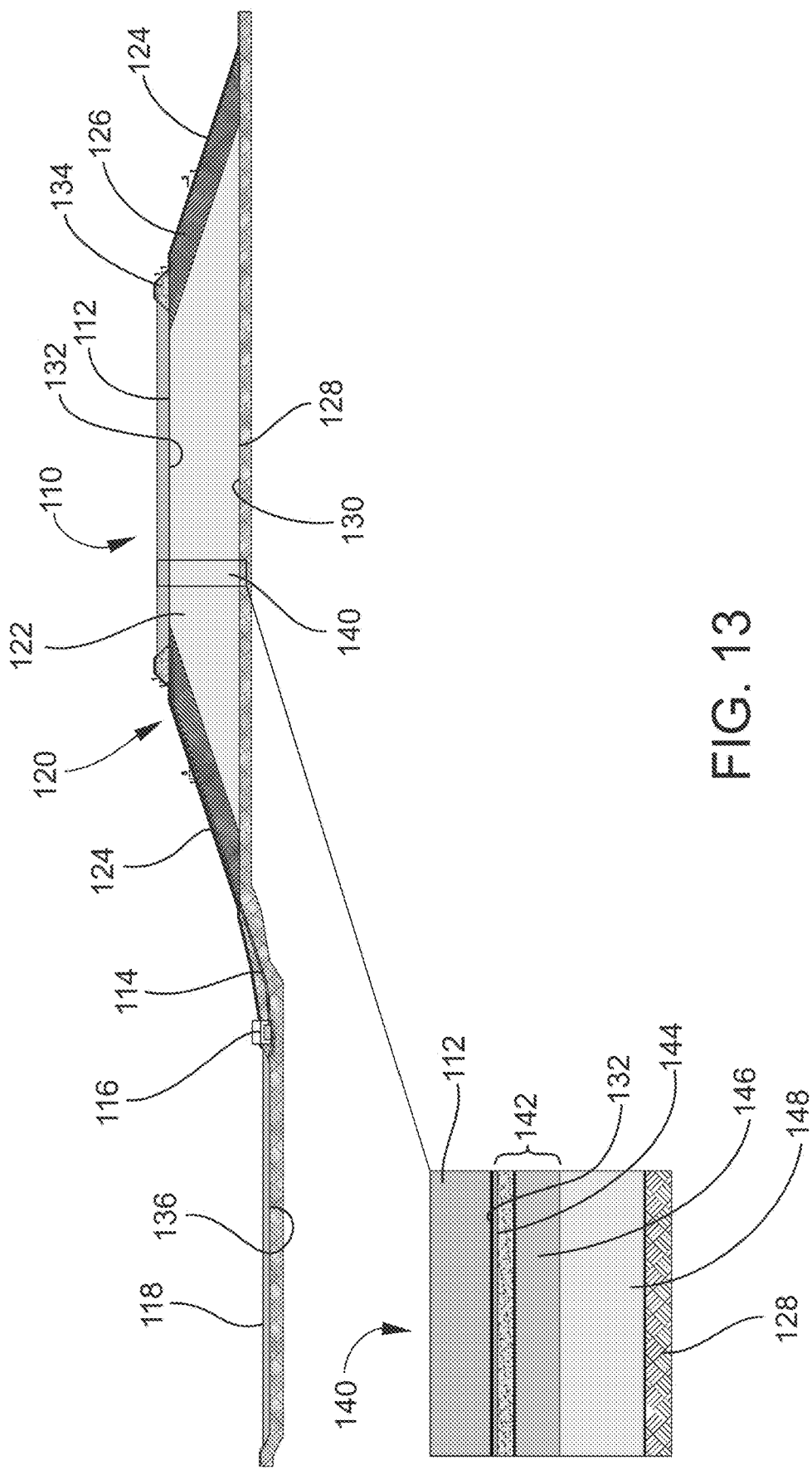
FIG. 13 is a cross section of a water storage system having upper and lower storage reservoirs.

FIG. 13 is a cross-section of a pump hydroelectric generation facility 110 that includes an upper reservoir 112, a feed water penstock 114 that feeds water gravitationally from the upper reservoir 112 to and through a power house 116 and into a lower reservoir 118. In the embodiment of FIG. 13 the upper reservoir 112 is contained in an impoundment 120 constructed of encapsulated CCR 122, reinforced CCR slopes 124 and a covering 126 of vegetation. The base 128 of impoundment 120 is lined with an impervious liner 130 and the bottom of the upper reservoir 112 is similarly lined with an impervious liner 132. The upper slopes 124 are protected by a strengthened CCR berm 134 encircling the upper reservoir 112 that may include synthetic fabric for slope stability berm 134. The lower reservoir 118 is likewise lined with an impervious liner 136. If the lower reservoir is a pond that once held CCR and was excavated to make the CCR base for the upper reservoir—no liner will be required. This could change based on soil conditions of the site.

The pump hydroelectric generation facility 110 includes an optional leak detection system 140 that is placed below the upper reservoir 112. The leak detection system can be designed in many different configurations that achieve the same results, which is to be capable of determining if there is a leak in the protective barrier, typically a liner or some other barrier feature of the facility 110 has been damaged and/or compromised to the point of failure. Leak detection systems 140 may be included in more than one area or elevation, may have one or multiple liner systems, may use one of several or a combination of liner type materials such as HPDE(s) or Geocomposite Clay Liner(s), may contain different thicknesses and types of material for the drainage layer, may include none or multiple layers of encapsulated CCR, which may vary, may use super absorbent polymers (SAP) or other commercially available products in the drainage layer or leak detection zone, may use other soil types, or may use other materials. In the leak detection system 140 of FIG. 13, a primary leak detection zone 142 includes the liner 132, which may be textured 60 mil HDPE, a geocomposite clay layer 144, preferably 18 inches thick, and a 4 foot layer 146 of microencapsulated CCR.

A drainage layer, which is part of the primary leak detection zone 142, resides above the layer of microencapsulated CCR 146 and below the geocomposite clay layer 144. One method for the drainage layer would be a granular material that will let the liquid run to the side of the structure—which would be readily visible. The drainage layer may be a granular material that will allow the liquid to run to the side of the structure—which would be readily visible. The leak detection system sits on the base 128 of the impoundment 120. Sensors may be provided at positions in the top and bottom areas of the leak detection system to provide an alert if a leak above a predetermined threshold value occurs.

In addition to the cost effective construction method of beneficially using CCR for construction of fossil fuel storage facilities and/or pumped-storage reservoirs, many coal-fired power plants have been retrofitted to use natural gas in lieu of coal to lessen $CO_2$ greenhouse gas emissions in the electrical generation process. The gas lines that supply the natural gas to these power plants can be used to deliver natural gas to a fossil fuel storage facility during peak or off-peak electrical generation hours, depending on the capacity of the gas supply network.

All of the pressure vessels disclosed in this application can be used with or without the beneficial use of CCR for the construction of the pumped storage reservoir and/or the fossil fuel gas storage facility.

Some examples of materials other than strengthened CCR or roller-compacted concrete that can be used alone or in combination in the construction of dams, reservoirs and water impoundments, include but are not limited to rock fill, boulders, soil, cement, earthen fill, cohesive soils, precast, sheet piling, secant piling, masonry, slag, concrete, soil mixing, existing elevation features such as hills and surface elevation changes, grout faced rock, boulders, soil, or masonry, geomembranes on rock, boulders, earthen fill, or masonry, concrete faced rock fill, boulders, earthen fill, or masonry, steel, mine tailings, mortar fill between masonry or rock, rip-rap protection, underwater wood cribbing in combination with other materials and stone.

The above materials, along with strengthened CCR and/or roller compacted concrete can be used when the base is constructed using CCR alone, or using only the existing topography, or with the use or combination of existing topography and the beneficial use of CCR.

The mechanical design of a hydroelectric turbine generator used in the power-generating mode allows for a greater fluctuation in water head height than the operating range for water pumps that are used to fill the reservoirs in the recharging/refilling mode. As an example, a hydroelectric turbine generator could allow for a fluctuation in the depth of water in the reservoir of approximately 1.5 times the design depth (100 feet to 150 feet in height), whereas a pump would need multiple different pumps configurations to push against the increased water head pressure to pump and refill the water reservoir from its lowest level to its highest level (as an example, 100 to 150 feet in height). The hydroelectric turbine generator also has its greatest efficiency when the head pressure of the upper reservoir fluctuates a small percentage in its optimal design depth. These engineering design characteristics will allow some applications, with sites that do not have engineering constraints, such as blue line stream and/or protected wetlands, to have a reservoir with a wider base and less height versus having a higher elevation reservoir with less area of the reservoir base.

Some hydroelectric turbines operate in reverse fashion, which allows the same machine to pump water to a higher elevation to refill the upper reservoir in addition to being the hydroelectric generation unit when electricity is produced. Hydroelectric generation units can be either synchronous or asynchronous (induction) generators. Although asynchronous generators require inverters or power electronics to get the electric power to grid frequency, there may be engineering design reasons when either a synchronous or an asynchronous type of hydro electrical generation units will be used with this invention.

Some hydroelectric pump storage facilities have separate pump(s) and separate hydroelectric generator(s). The pumps normally sit idle when the hydroelectric turbines are being used, but they can have the ability to operate at full or reduced capacity while the hydroelectric turbine electrical generator(s) are operating. When the depth of the upper reservoir has a large fluctuation from its lowest level to its highest level of water elevations, it may require several different types of pumps to compensate for the large variations in elevation of the water during the recharging/refilling mode. Having several different refill pumps for a single reservoir decreases the utilization for each pump, which increases the overall cost per electrical production. There may be economic and/or engineering design reasons when separate pump(s) and separate hydroelectric turbine(s) will be used. There may also be economic and/or engineering design reasons where one machine can provide both the pumping and the hydroelectric generation.

The apparatus in this invention can be used in many different locations that have varying degrees of topography and many different types of onsite or nearby geotechnical materials that may be used to economically construct both the upper and lower reservoirs.

Based on the water pump and hydroelectric turbine design characteristics as discussed above, and with the understanding that many sites will allow for an upper reservoir that has a greater footprint/area in size and less depth in water and still hold approximately the same water volume for the pump storage reservoir with a smaller footprint but with a deeper water impoundment area due to site constraints. The apparatus of this invention can be used on sites with CCR, but can also be used on sites that have no CCR and where other construction materials may be the best choice for the most economical and cost effective method to construct dams, impoundments, or reservoirs other than roller-compacted concrete or strengthened CCR. There are many different types of dam and reservoirs that can be constructed for use with the apparatus in this invention.

Figure 14:
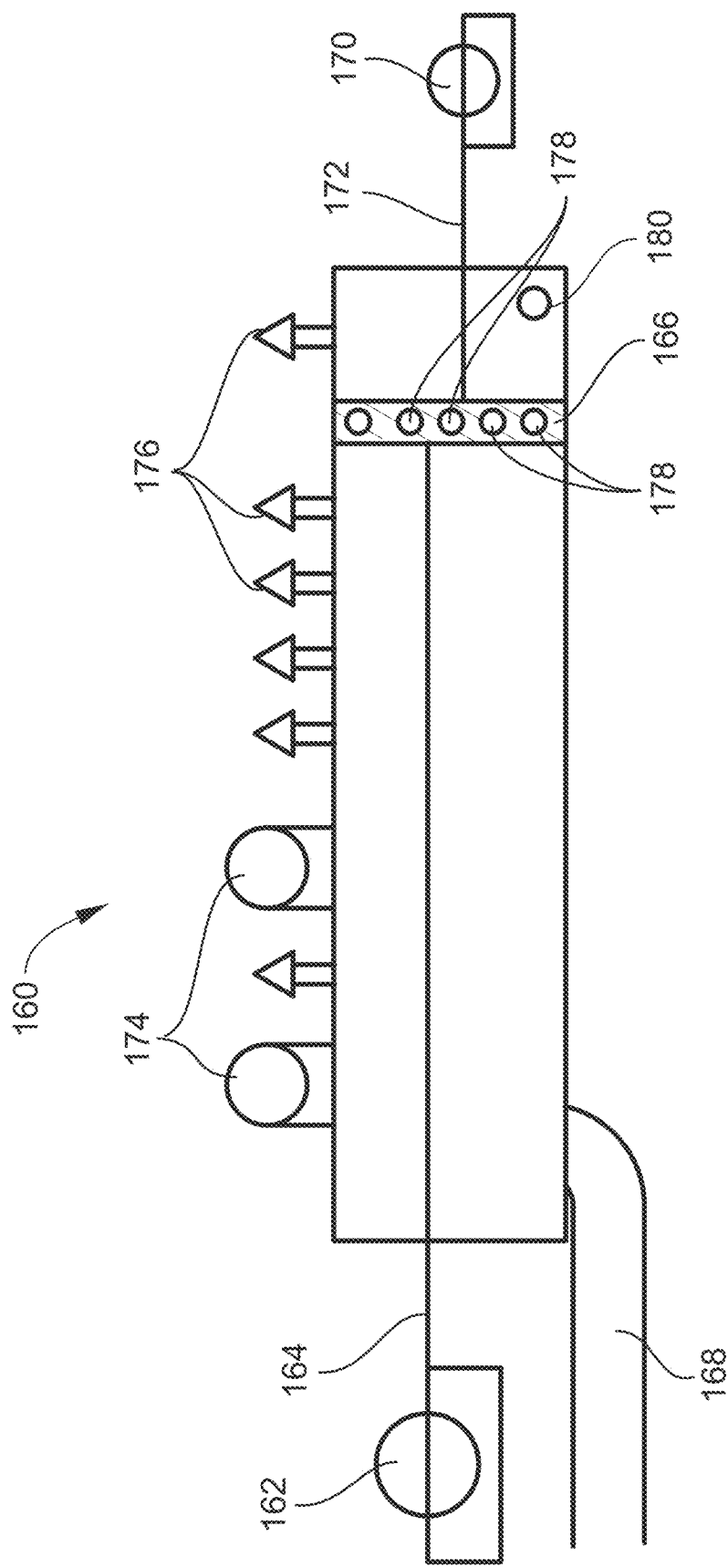
FIG. 14 is a vertical cross-section of a single action, one way pressure vessel.

Referring now to FIG. 14, a single action, one-way pressure vessel 160 is shown in cross-section. The pressure vessel 160 is an integral component of an electricity generating facility as described in this application that includes an upstream water supply, a downstream hydroelectric turbine and a downstream water discharge zone that may be a closed loop or open loop system. Also as disclosed, a plurality of pressure vessels 160 will operate in sequence whereby pressurized water is at all times being supplied to the downstream hydroelectric turbine. The pressure vessel 160 uses a hydraulically operated winch 162 and cable 164 as a driver to move a push plate 166 mounted for reciprocating movement within the pressure vessel 160. As shown, movement of the push plate 166 towards the winch 162 pressurizes water in the pressure vessel 160 and forces the water through a water discharge line 168 to a penstock, not shown. A separate, less powerful winch 170 and cable 172 can be used to retract the push plate 166 during the water refilling cycle. Water is introduced into the pressure vessel 160 through water feed lines 174. Air is exhausted from the pressure vessel 160 through air vents 176.

FIG. 14 shows only one connection point of the cable 164 to the push plate 166, but depending on the design pressure of the hydroelectric turbine there may be several cables and/or several connection points to the push plate 166. The pressure vessel 160 is shown as rectangular in shape, but many different configurations including circular or trapezoidal pressure vessels can be used.

Single drum or double drum winches, or one to multiple winches may be used for each pressure vessel 160 depending on the size and design pressure. The design may use no pulleys or several different pulleys inside a block and tackle system configuration. The use of pulleys has the mechanical advantage of allowing the use of the same power rated winch to increase the pressure on the water inside the pressure vessel 160 with the disadvantage of the increased cost of additional cable length and spooling capabilities of the winch 162 for the lengthened cable 164 that is used in a pulley system.

FIG. 14 shows the pressure vessel 160 being level in elevation, but the pressure vessel 160 can be sloped in many different directions but with the preferred embodiment of sloping the pressure vessel 160 toward the water discharge line 168 that leads to the penstock with the optional use of fairleads and or fixed placed sheaves to guide the cables 164 and 172. This possible sloped configuration will allow gravity to create momentum of the mass of water at the start of the discharge cycle of the pressure vessel 160. Although not shown in FIG. 14, pressurized air and/or hydraulic rams may be used to create the momentum of the mass of water inside the pressure vessel when the winch 162 starts to pull the push plate 166 at the start of the discharge cycle mode of operations. Pressurized air or air blowers may supplement the pressure on the water inside the pressure vessel during the discharge cycle by depositing the air on the backside of the push plate 166, in addition to the forward propelling forces created by the winch 162. The cable 164, which travels from the inside of the pressure vessel 160 toward the winches 162 and 172, can be covered with a polymer or other type of material which will allow for a low friction interaction between the cables 164, 172 and their respective passage points from inside the pressure vessel 160 to outside the pressure vessel 160.

Water inflow and outflow values will operate and function in the same manner as described in U.S. patent application Ser. No. 17/013,070 and U.S. Pat. Nos. 10,781,787 B2 and 10,871,142 B2. The air vents 176 as shown in the embodiment of FIG. 14 will open as the push plate 166 passes their locations as it travels towards the water discharge line 168. The opening of the air vents 176 will allow air to flow inside the pressure vessel 160 so as not to cause suction forces on the back of the push plate 166. The functional air vents 176 will be closed at the start of the winch-pulling mode, so that water does not pass through the air vents 176. Rollers 178 on the push plate 166 reduce friction on the top, bottom, and both sides of the push plate 166 as it moves. A drain 180 permits the pressure vessel 160 to be emptied as needed.

The winch 162 of FIG. 14 is preferably a hydraulically operated winch, but electric and pneumatic winches can be used if desired. The pressure vessel 160 can be refilled with mechanical refill pumps, but the pressure vessel 160 can also be placed at an elevation lower than the water source, which could allow gravity and/or a combination of pump(s) to be used to refill the pressure vessel 160. The push plate 166 can have an increased depth to provide more stability and reduce the ability of the push plate 166 to misalign during operation.

Figure 15:
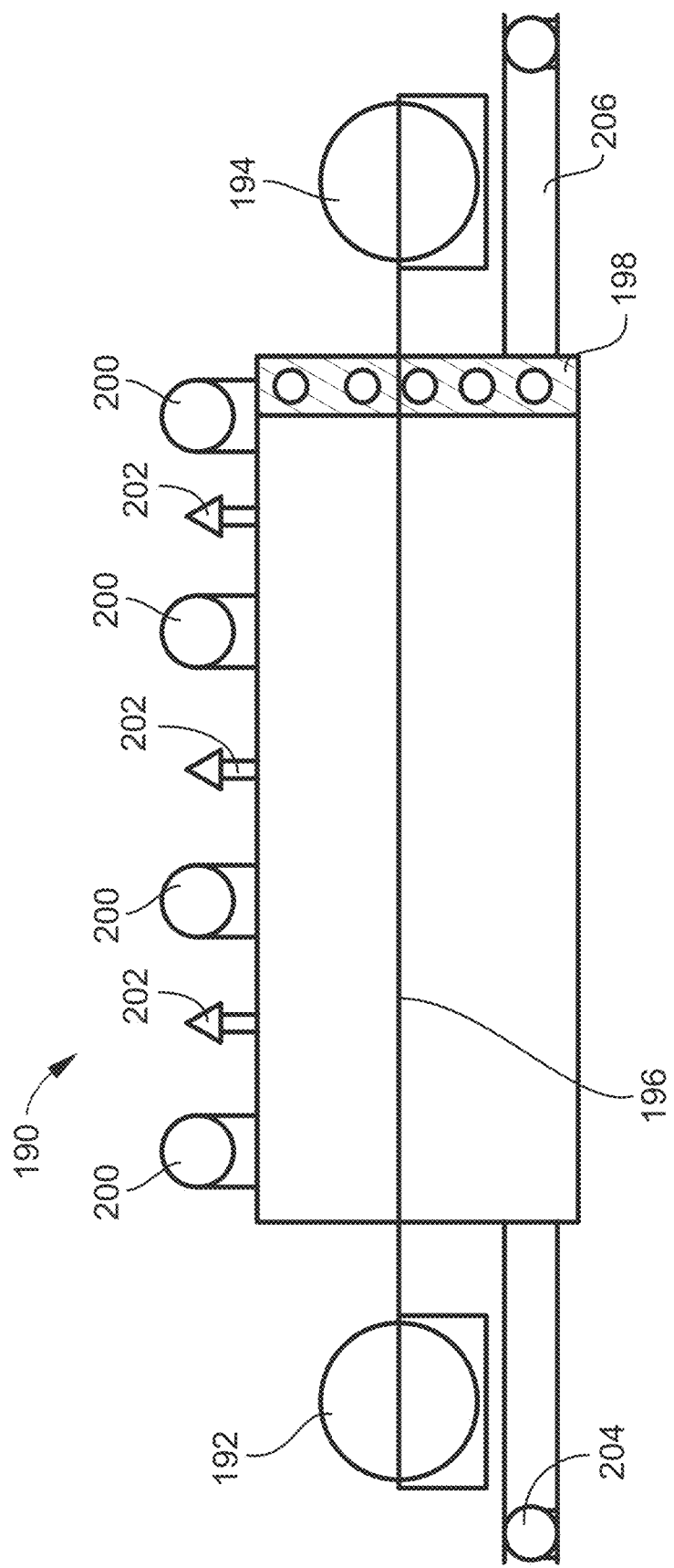
FIG. 15 is a vertical cross-section of an embodiment of a double-acting pressure vessel adapted to push water in the pressure vessel using winches.

Referring to FIG. 15, a double-acting pressure vessel 190 is illustrated that includes pulling winches 192 and 194 on opposing ends of the pressure vessel 190 and are designed to act as drivers to alternately push water out of both ends of the pressure vessel 190. A cable 196 connects the winches 192, 194 and is attached to a push plate 198. For further detail of push plate 198, see push plate 166 of FIG. 14. With the proper sequencing of water refill valves 200 and air inlet and outlet valves 202, this embodiment allows for the refilling of the pressure vessel 190 nearly simultaneously with the water discharging operation through water discharge lines 204, 206 to the downstream penstock and hydroelectric turbine 40. This will allow for a higher utilization rate of the pressure vessels 190, which will allow for less capital cost for the construction of the pressure vessels 190.

Figure 16:
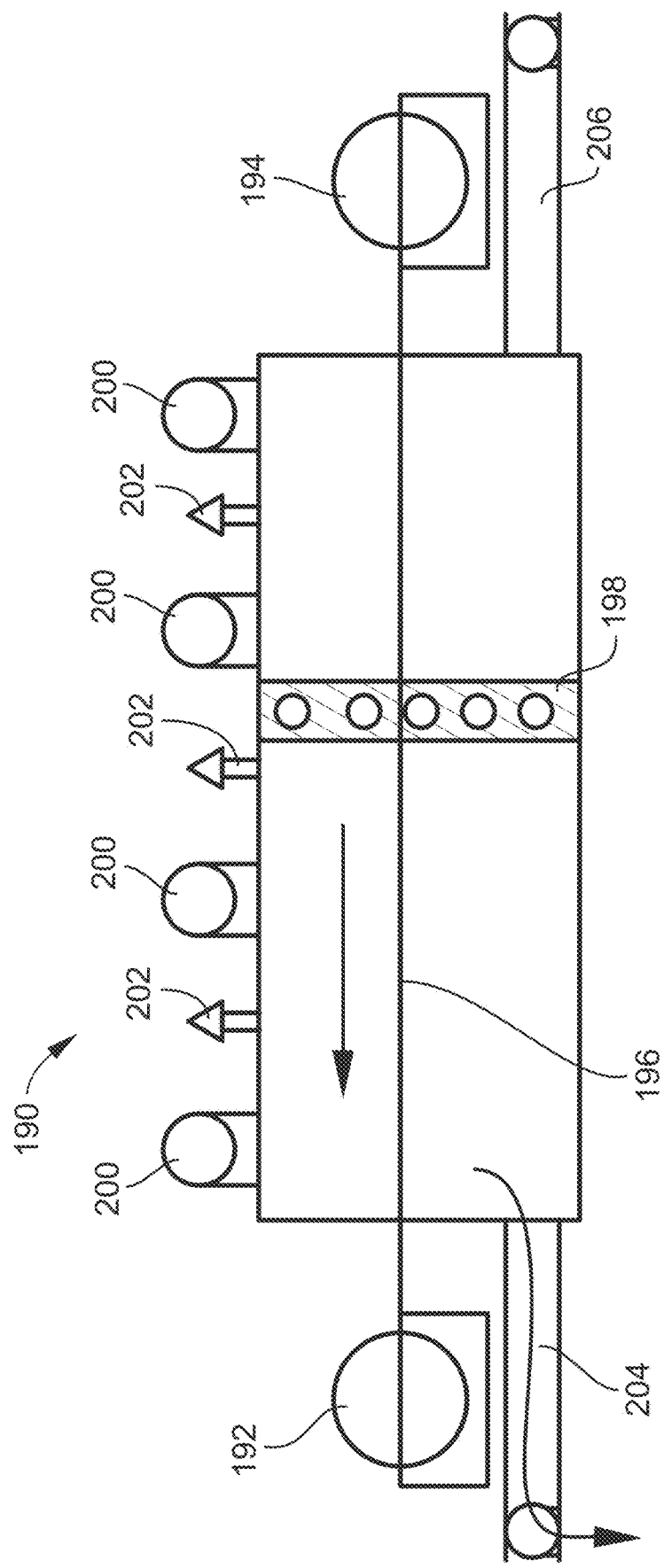
FIG. 16 is a vertical cross-section of the embodiment of FIG. 15 showing winch-activated water movement in a first direction.
Figure 17:
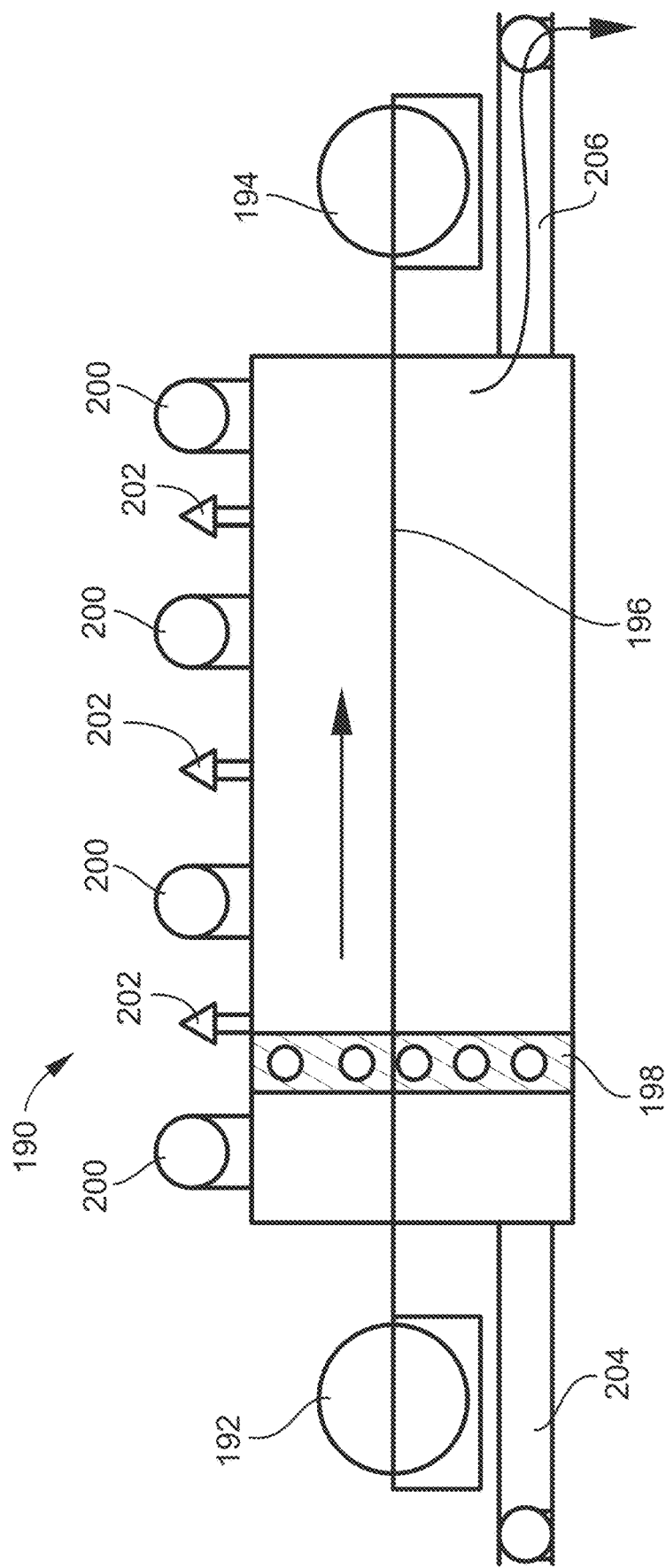
FIG. 17 is a vertical cross-section of the embodiment of FIG. 15 showing winch-activated water movement in a second, opposite direction.

FIGS. 16 and 17 illustrate water travel in the right to left direction under the operation of the left hand winch 192 and left to right water travel under the operation of the right hand winch 194. Operation of the system results in back and forth operation of the winches 192, 194 with a resultant reciprocation in the component elements of the system resulting in continuous energy production. As previously noted with reference to other embodiments, the pressure vessel 190 is an integral component of an electricity generating facility as described in this application that includes a water supply, a downstream hydroelectric turbine and a downstream water discharge zone that may be a closed loop or open loop system. Also as disclosed, a plurality of pressure vessels 190 will operate in sequence whereby pressurized water is at all times being supplied to the downstream hydroelectric turbine.

Figure 18:
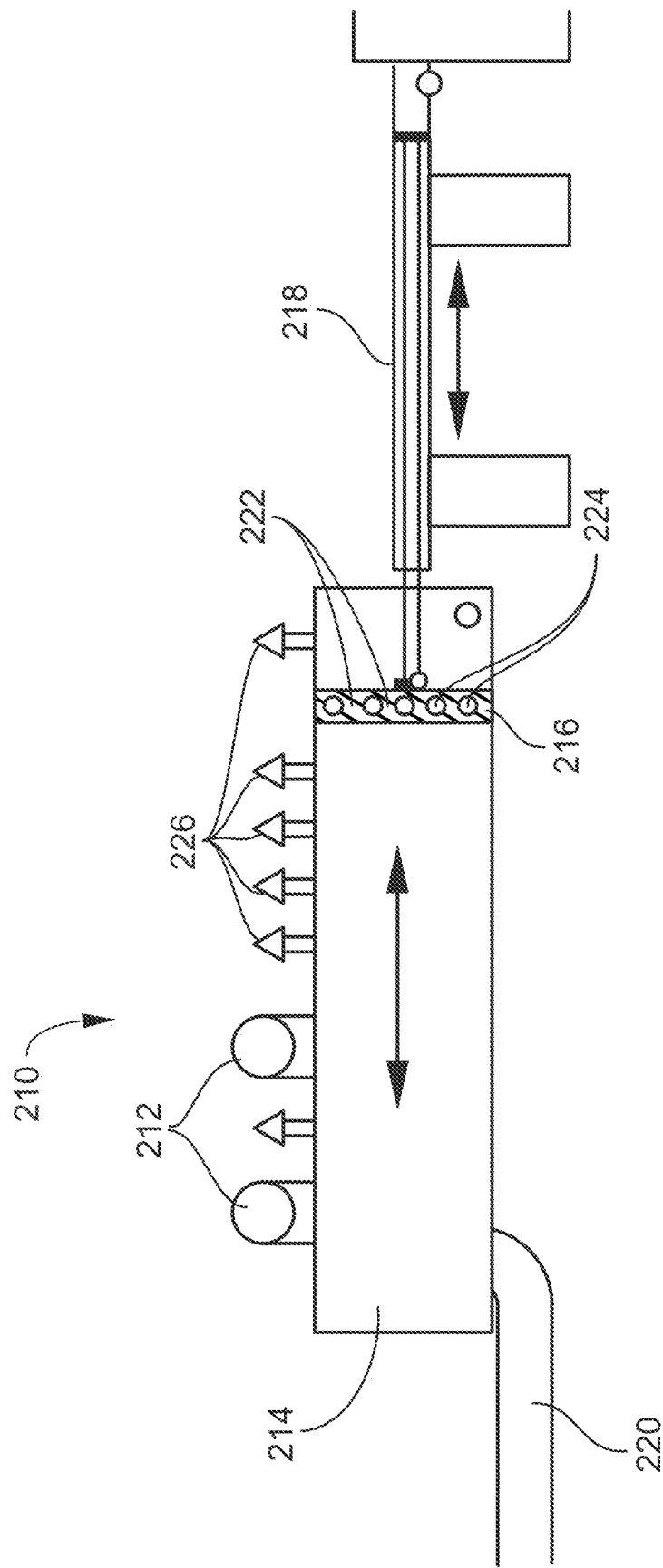
FIG. 18 is a schematic side elevation showing use of a horizontal hydraulic cylinder to charge the pressure vessel.

Referring to FIG. 18, a double-acting pressure vessel 210 is shown, and includes water feed lines 212 by which water is introduced into the interior 214 of the pressure vessel 210. A push plate 216 having the same basic structure and operation as push plate 166 of FIG. 14 is positioned in the pressure vessel 210 and reciprocates within the pressure vessel 210 under the impetus and control of a double acting hydraulic piston/cylinder assembly 218. During the pressure stroke the hydraulic piston/cylinder assembly 218 moves the push plate 216 right to left pressurizing the water in the pressure vessel 210 and forcing it out of the pressure vessel 210 through the water discharge line 220 and downstream to the hydroelectric turbine, not shown. On the return stroke the hydraulic piston/cylinder assembly 218 moves the push plate 216 left to right with the rollers 224 reducing friction on the push plate 216. See also FIG. 14 and above description of FIG. 14 for further details.

Figure 19:
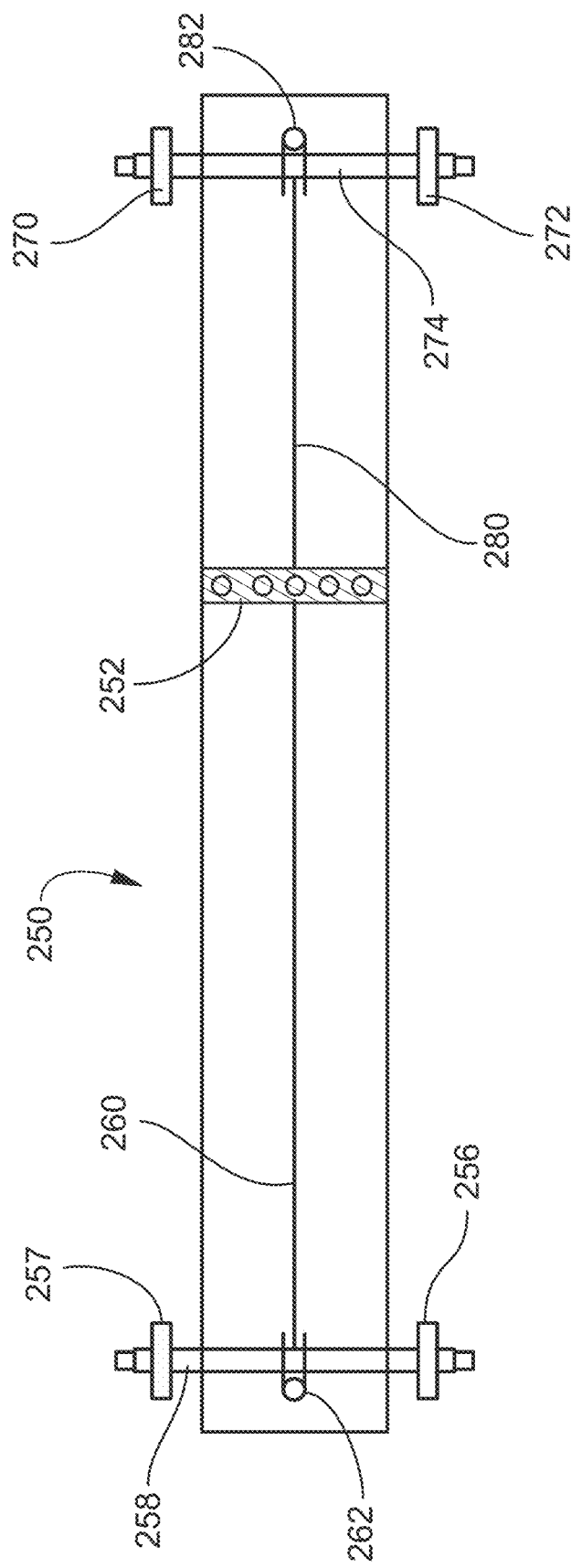
FIG. 19 is a schematic top plan view of a pressure vessel with a pressure plate reciprocated in the pressure vessel by pairs of opposed motors exterior to the pressure vessel.

Referring now to FIG. 19, another embodiment of the pressure vessel is shown at reference numeral 250. As with other embodiments, a push plate 252 is mounted in the pressure vessel 250 for reciprocating movement. In the embodiment of FIG. 19, the push plate 252 is moved in one direction under the power of motors 256, 257 mounted on shaft 258 exterior to the pressure vessel 250. Shaft 258 extends laterally through the pressure vessel 250 to the exterior, with the motors 256, 257 mounted on the exterior of the pressure vessel 250. Seals, not shown, prevent leakage around the shaft 258. A cable 260 is positioned in the pressure vessel 250 and connected to the push plate 252 and the shaft 258. A cable guide 262 applies the cable 260 to the shaft 258 in an ordered array. As the cable 260 is wound onto the shaft 258 the push plate 252 is moved towards the shaft 258.

The push plate 252 is moved in a direction opposite the direction urged by motors 256, 257 under the power of motors 270, 272. Shaft 274 extends laterally through the pressure vessel 250 to the exterior of the pressure vessel 250, with the motors 270, 272 mounted on the shaft 274 to the exterior of the pressure vessel 250. Seals, not shown, prevent leakage around the shaft 274. A cable 280 is positioned in the pressure vessel 250 and connected to the push plate 252 and the shaft 274. A cable guide 282 applies the cable 280 to the shaft 274 in an ordered array. As the cable 280 is wound onto the shaft 274, the push plate 252 is moved towards the shaft 274. As described elsewhere, this reciprocal motion repeatedly draws water into the pressure vessel 250 on one side of the push plate 252 while water on the other side of the push plate 252 is being expelled under pressure out of the pressure vessel 250 and downstream to generate electric power.

Figure 20:
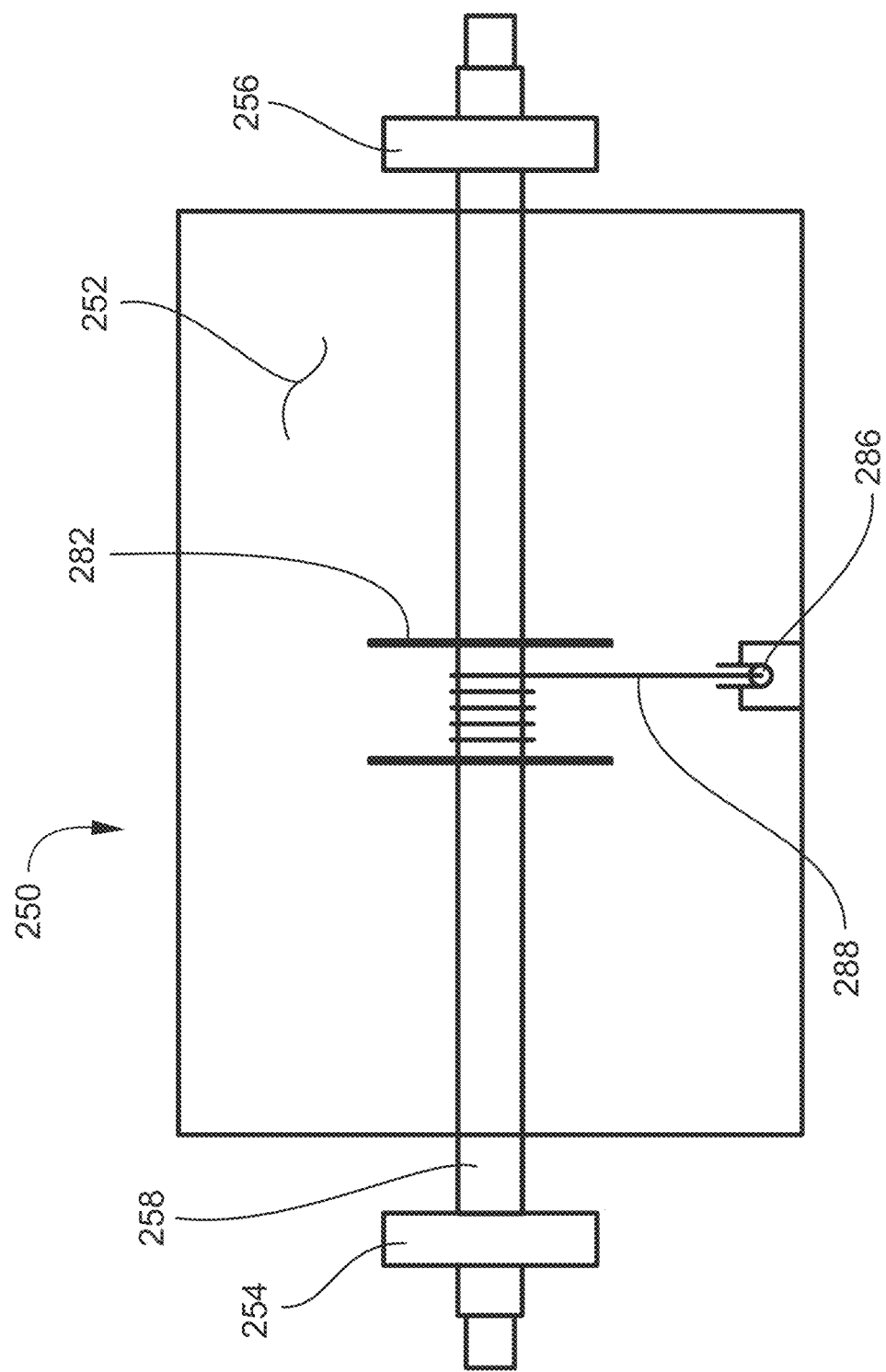
FIG. 20 is a schematic vertical end view of one of the pairs of motors shown in FIG. 19.

A vertical end view of the pressure vessel 250 is shown in FIG. 20. An optional cable return 286 is shown for use when a single cable 288 or two cables attached to opposite sides of the push plate 252 in an endless loop whereby all four motors 256, 257, 270 and 272 of FIG. 19 are simultaneously moving the push plate 252 in a specified direction.

Figure 21:
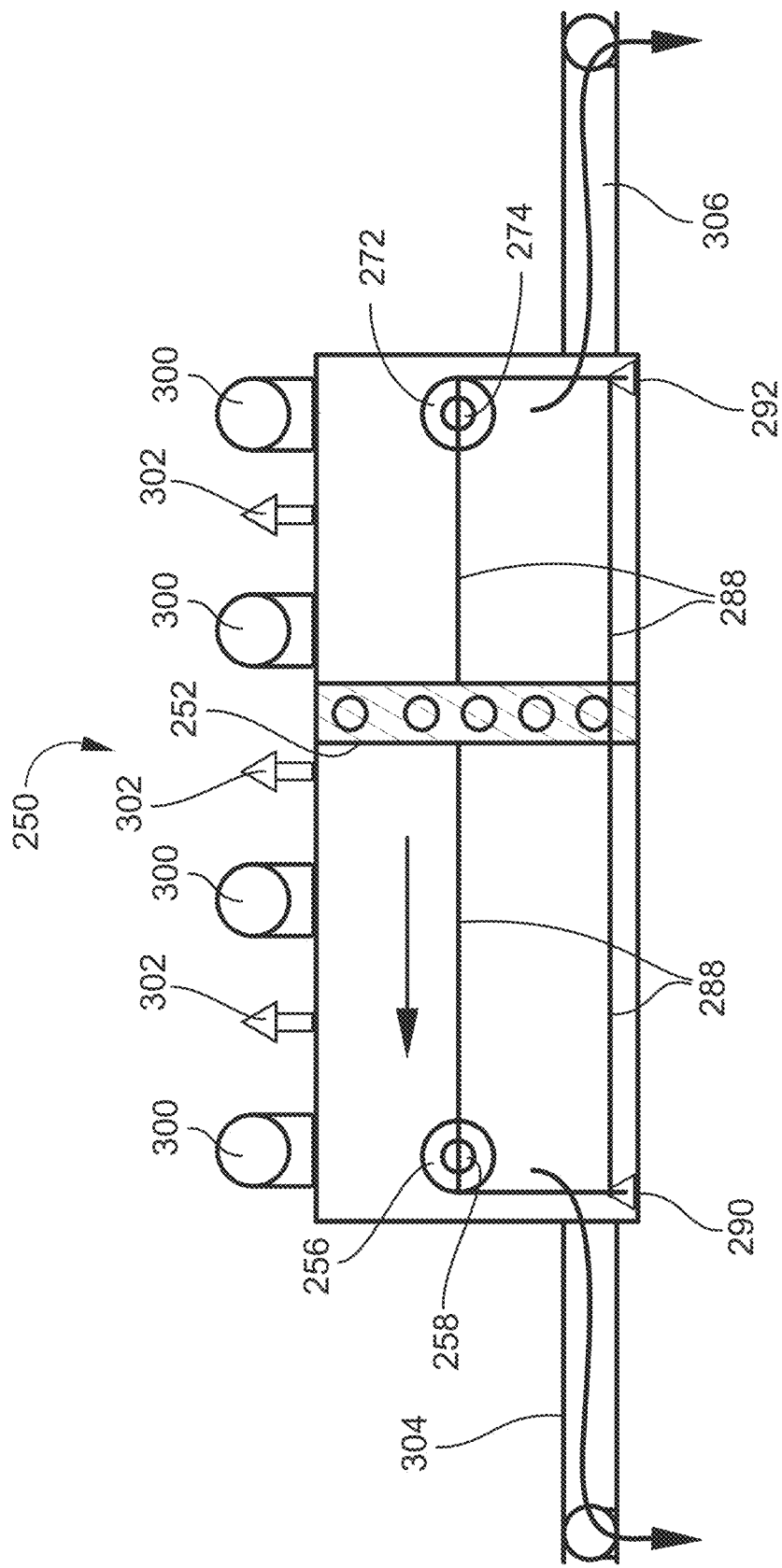
FIG. 21 is a schematic side elevation of a pressure vessel with a pressure plate reciprocated in the pressure vessel by opposed motors, wherein the opposed motors operate in unison to reciprocate the pressure plate.

This feature is shown in FIG. 21. Sheave pulleys 290 and 292 permit the endless cable 288 to move in right angle turns through the pressure vessel 250 as the push plate 252 is reciprocated through the pressure vessel 250. As with other embodiments, the pressure vessel 250 includes water refill valves 300 and air outlet valves 302. Water discharge lines 304, 306 deliver pressurized water to a downstream penstock and hydroelectric turbine 40, for example, as shown in FIG. 4. In one embodiment, valves at the exit piping 304 and 306 may be employed to control water flow. For example, if water is refilling into the pressure vessel 250 by gravity or mechanical pumping, the penstock water being forced out of the other end of the pressure vessel 250 will backflow into the end/side of pressure vessel 250 during refilling operations without suitable valve operation to control water flow.

Figure 22:
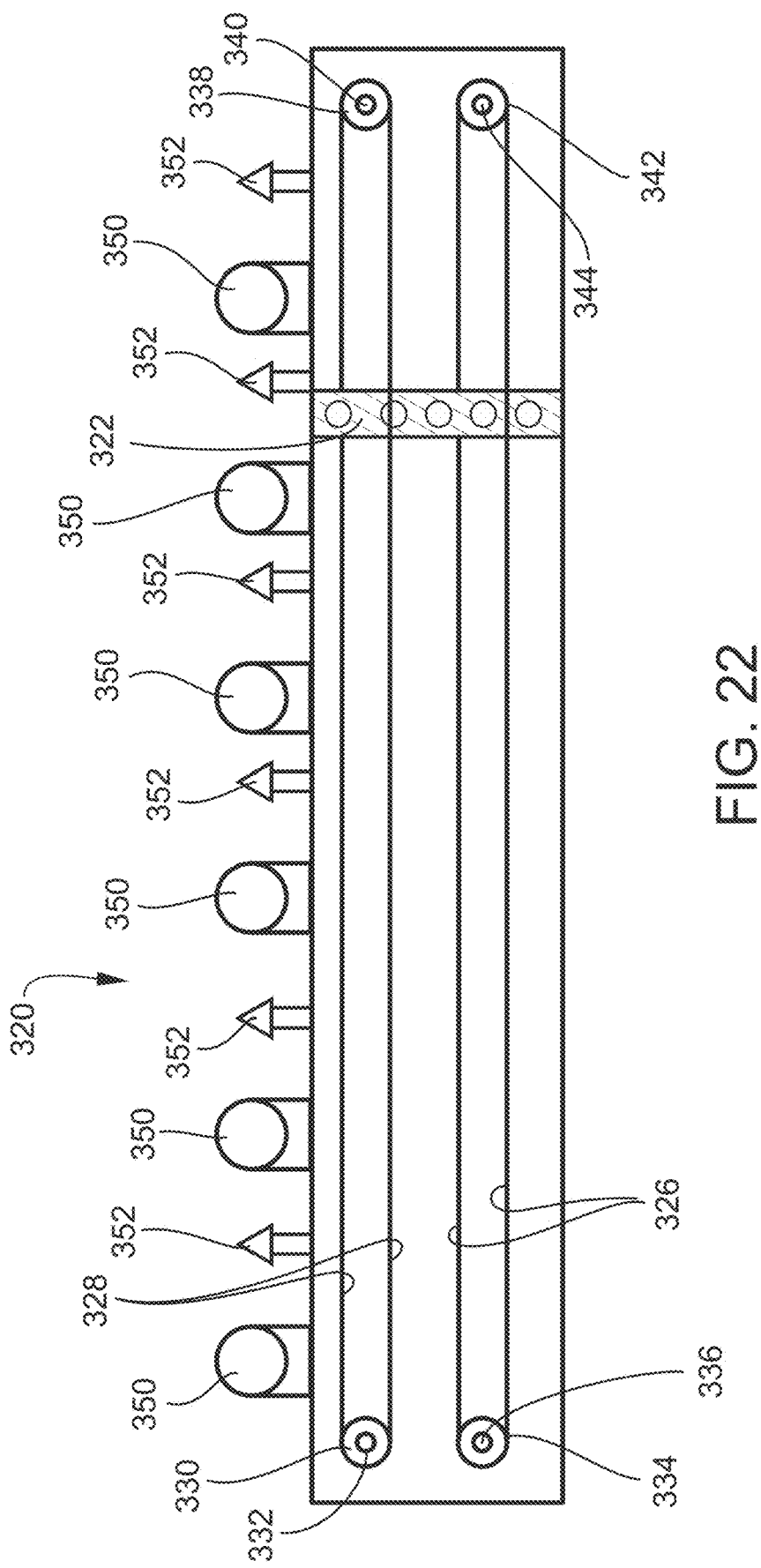
FIG. 22 is a schematic side elevation of a pressure vessel with a pressure plate reciprocated by multiple vertically-positioned motors.

Referring to FIG. 22, a pressure vessel embodiment 320 is shown with a push plate 322 that is moved in the pressure vessel by two vertically spaced cables 326, 328, each driven by respective motors 330, 334, 338 and 342 mounted on respective shafts 330, 334, 340 and 344. Four other motors, not shown, are mounted on the other end of the respective shafts 332, 336, 340 and 344. As with the embodiments of FIGS. 19-21, the cables 324, 326 are preferably powered simultaneously in unison by each of the motors 330, 334, 338 and 342 and the other, not shown, motors. As with other embodiments, the pressure vessel 320 includes water refill valves 350 and air outlet valves 352.

Figure 23:
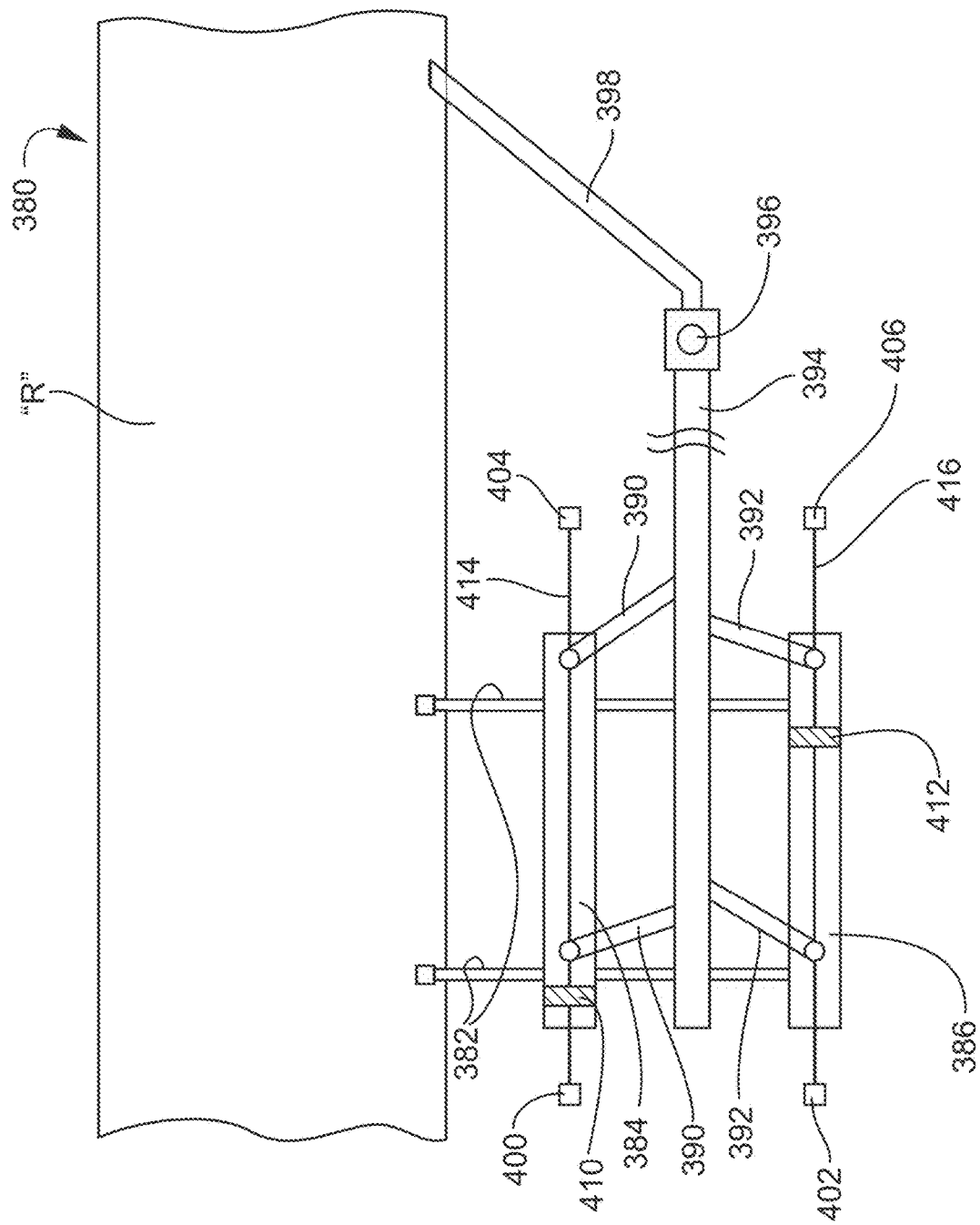
FIG. 23 is a schematic top plan view of a closed loop.

Referring now to FIG. 23, a closed loop pumped storage electricity generating system 380 is schematically shown. A reservoir "R" feeds water refill valves 382 that transfer water to a pair of pressure vessels 384 and 386. These pressure vessels 384 and 386 operate as described above to pressurize water and deliver it through water discharge lines 390, 392 into a main trunk conduit 394 and downstream to a electricity-generating turbine 396. Spent water is passed from the turbine 396 downstream through a discharge conduit 398 and back into the reservoir "R".

As in the above descriptions, the pressure vessels 384 and 386 operate by motors 400, 402, 404 and 406 connected to respective push plates 410, 412 by cables 414 and 416, respectively. As shown, the pressure vessels 384 and 386 operate in opposition, wherein one pressure vessel 384 is taking in water from the reservoir "R" while the other pressure vessel 386 is discharging water under pressure downstream to the turbine 396, and vice versa.

Figure 24:
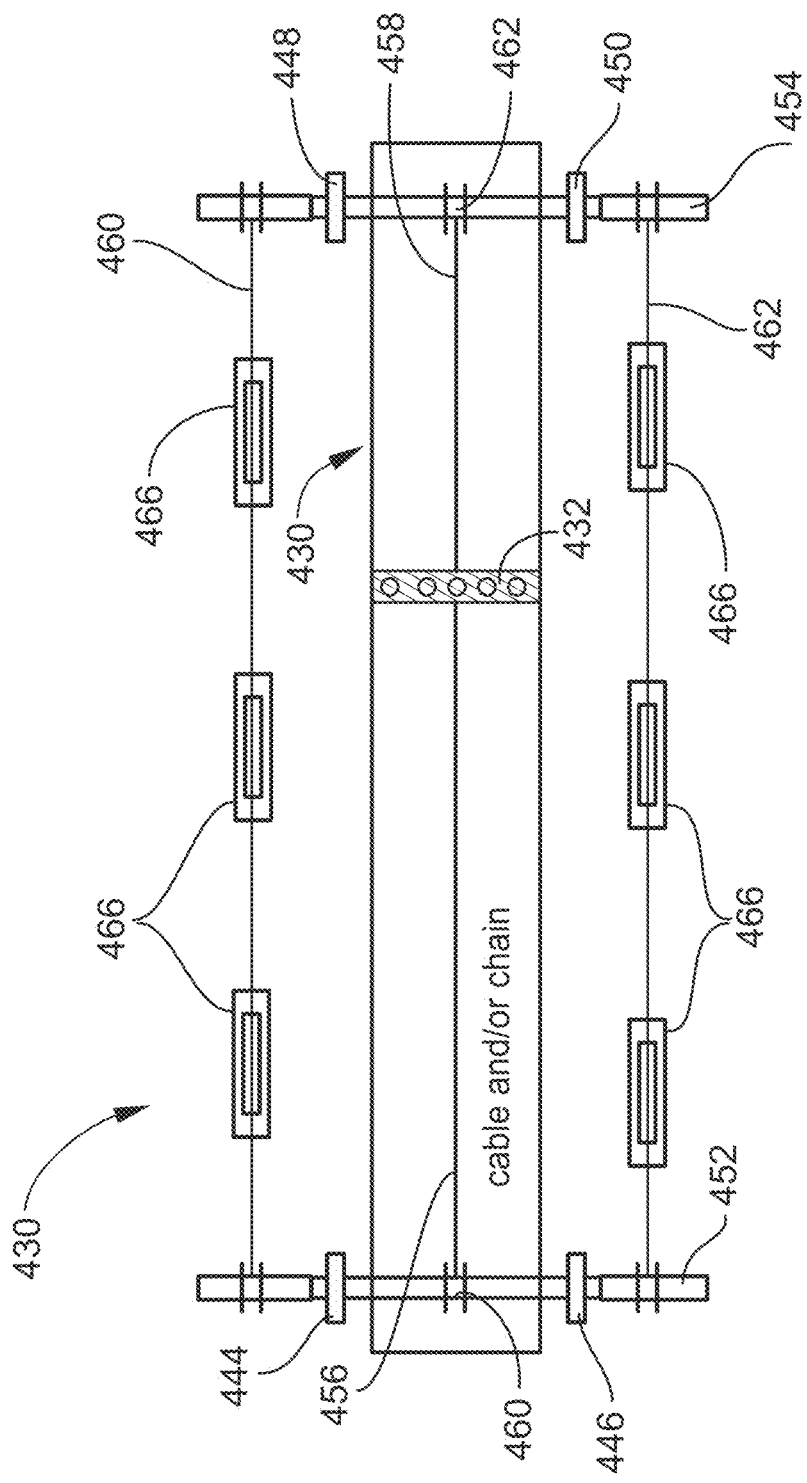
FIG. 24 is a schematic top plan view of a pressure vessel with a pressure plate reciprocated in the pressure vessel by pairs of opposed motors and drive cables exterior to the pressure vessel operating in unison.

FIG. 24 schematically illustrates a pumped storage electricity generating system that includes a pressure vessel 430 in which is positioned for reciprocating movement a push plate 432 by means of motors 444, 446, 448 and 450. As shown, these motors 444, 446, 448 and 450 are mounted exteriorly to the pressure vessel 430 on laterally-extending shafts 452, 454 that extend through opposite ends of the pressure vessel 430. Cables 456, 458 connect the shafts 452, 454 to the push plate 432 in the interior of the pressure vessel 430. Cable guides 460, 462 guide the cables 456, 458 on the shafts 452, 454.

The push plate 432 is also reciprocated within the pressure vessel 432 by cables 460, 462 mounted on the shafts 452, 454 exterior to the pressure vessel 430. The cables 460, 462 are guided and supported by fair leads 466. The cables 460, 462, though not directly connected to the pressure plate 432, provide power through the shafts 452 454 and the cables 456, 458.

Note that while widely variable, the length of a pressure vessel such as pressure vessel 430 and others disclosed in this application may be 150 meters or more in length, making support of the cables 460, 462 exterior to the pressure vessel 430 desirable, if not necessary.

In the FIG. 24 embodiment the cables 460, 462 do not operate in an endless loop as in FIG. 21, for example. Instead, the cables 460, 462 are reciprocated by the rotation of the shafts 452, 454, thus reciprocating the push plate 432.

Figure 25:
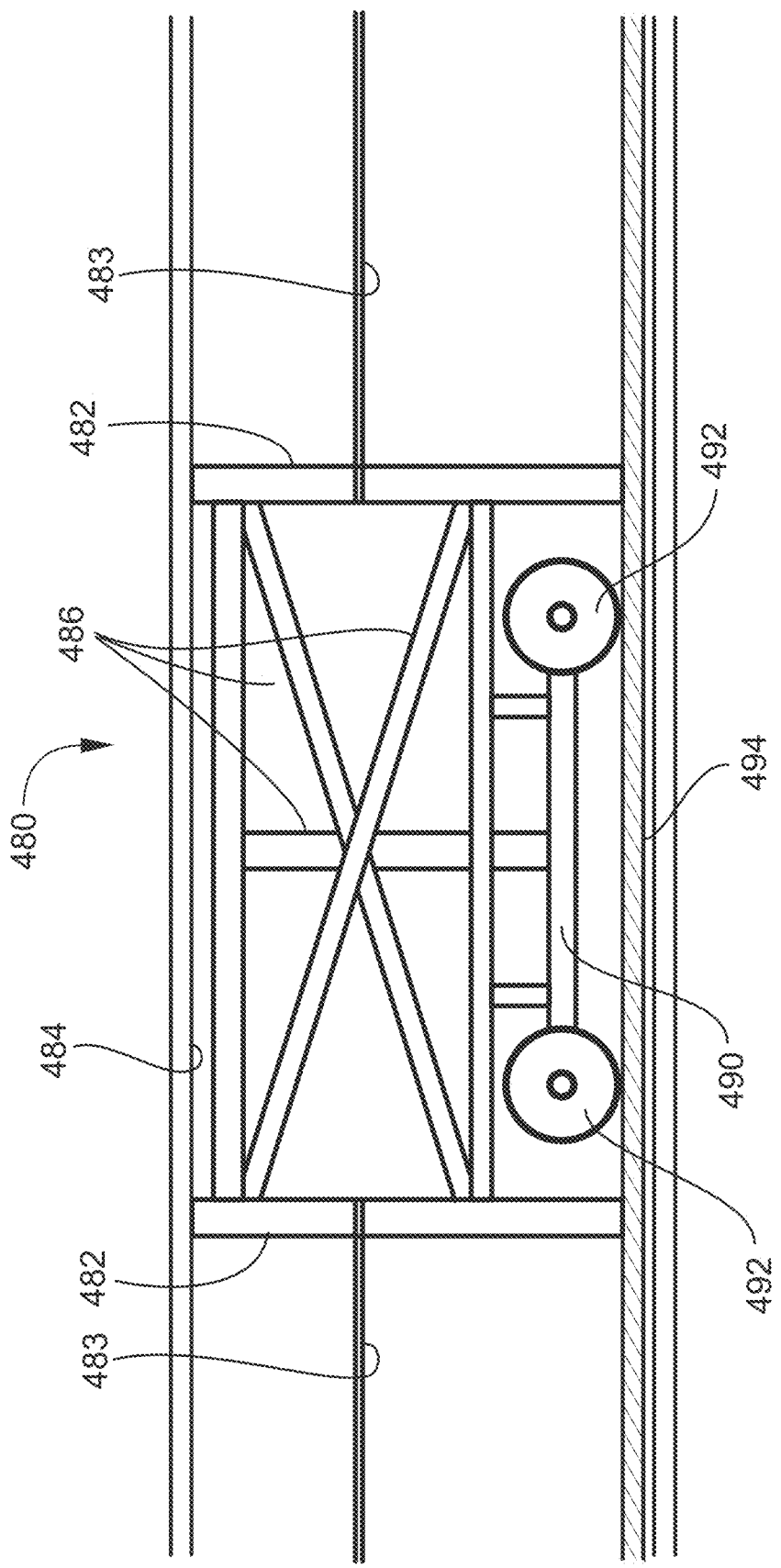
FIG. 25 is a schematic view of a wheeled support mechanism for the push plates discloses according to the several embodiments of the invention.

Referring now to FIG. 25, a pressure vessel 480 is shown in which is positioned a push plate 482. As in other embodiments, the push plate 482 is moved through the pressure vessel 480 by opposed motors (not shown) connected to the push plate by cables 483. The push plate 482 includes a bogie compartment 484 that serves two purposes. First, reinforcing structures, for example, steel bracing 486, provide strength, stability and resistance to warping and deflection under operating stresses to the push plate 482. Second, the bogie compartment 484 provides a location for a bogie 490 that carries a wheel set 492 of four wheels (two shown) that ride on a pair of parallel rails 494 (one shown) that extend substantially the entire bottom length of the pressure vessel 480. Seals, not shown, between inner walls of the pressure vessel 480 and the outer periphery of the push plate 482, prevent water from entering the bogie compartment 484. Rolling movement of the push plate 482 reduces the energy required to reciprocate the push plate 482 along the length of the pressure vessel 480.

Figure 26:
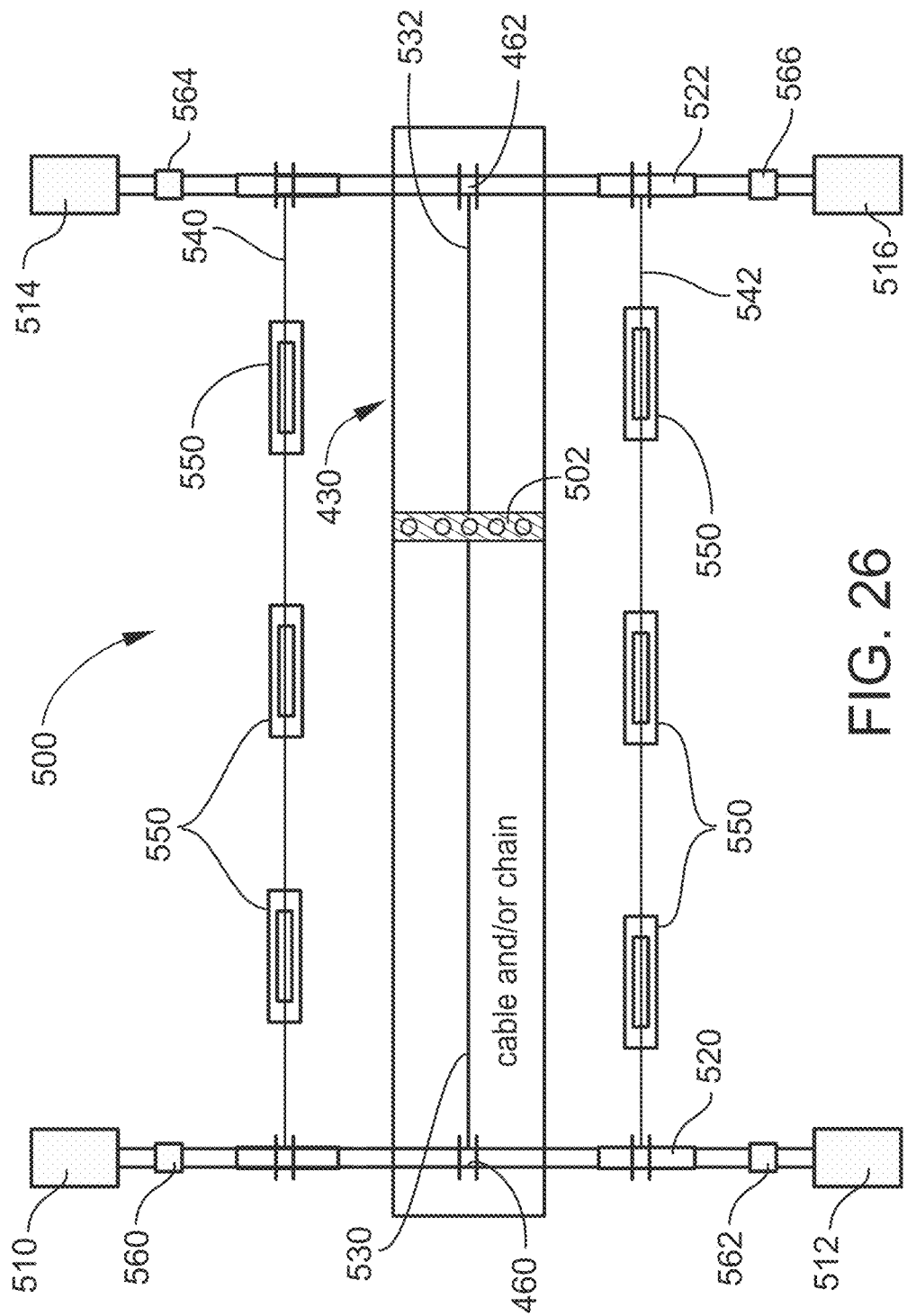
FIG. 26 is a schematic view of a further embodiment of the invention.

FIG. 26 schematically illustrates a pumped storage electricity generating system that includes a pressure vessel 500 in which is positioned for reciprocating movement a push plate 502 by means of motors 510, 512, 514 and 516. As shown, these motors 510, 512, 514 and 516 are mounted exteriorly to the pressure vessel 500 on laterally-extending shafts 520, 522 that extend through opposite ends of the pressure vessel 500. Cables 456, 458 connect the shafts 452, 454 to the push plate 432 in the interior of the pressure vessel 430. Cable guides 530, 532 guide the cables 530, 532 on the shafts 520, 522.

The push plate 502 is also reciprocated within the pressure vessel 500 by cables 540, 542 mounted on the shafts 520, 522 exterior to the pressure vessel 500. The cables 540, 542 are guided and supported by fair leads 550. The cables 540, 542, though not directly connected to the pressure plate 500, provide power through the shafts 520, 522 and the cables 530, 532.

In the FIG. 26 embodiment the cables 530, 532 do not operate in an endless loop as in FIG. 21, for example. Instead, the cables 530, 532 are reciprocated by the rotation of the shafts 520, 522, thus reciprocating the push plate 502.

The motors 510, 512, 514 and 516 are preferably combustion-type engines, for example, marine engines powered by diesel or other combustible fuels. The motors 510, 512, 514 and 516 drive the cables 530, 532 and 540, 542 by direct drive via a drive connection apparatus such as a gear box, hydraulic or pneumatic clutch, respectively identified at reference numerals 560, 562, 564 and 566. The apparatuses 560, 562, 564 and 566 may be a combination of a gear box and a hydraulic or pneumatic clutch.

The motors 510, 512, 514 and 516 may be bi-directional, reversing direction as needed to reciprocate the direction of the push plate 502, or may operate through gear boxes 560, 562, 564 and 566 that engage gearing as necessary to achieve the required direction. A further alternative assigns a first direction to, for example, motors 510 and 514 that drive the push plate 502 in a first direction, and motors 512 and 516 drive the push plate 502 in a second direction.

Figure 27:
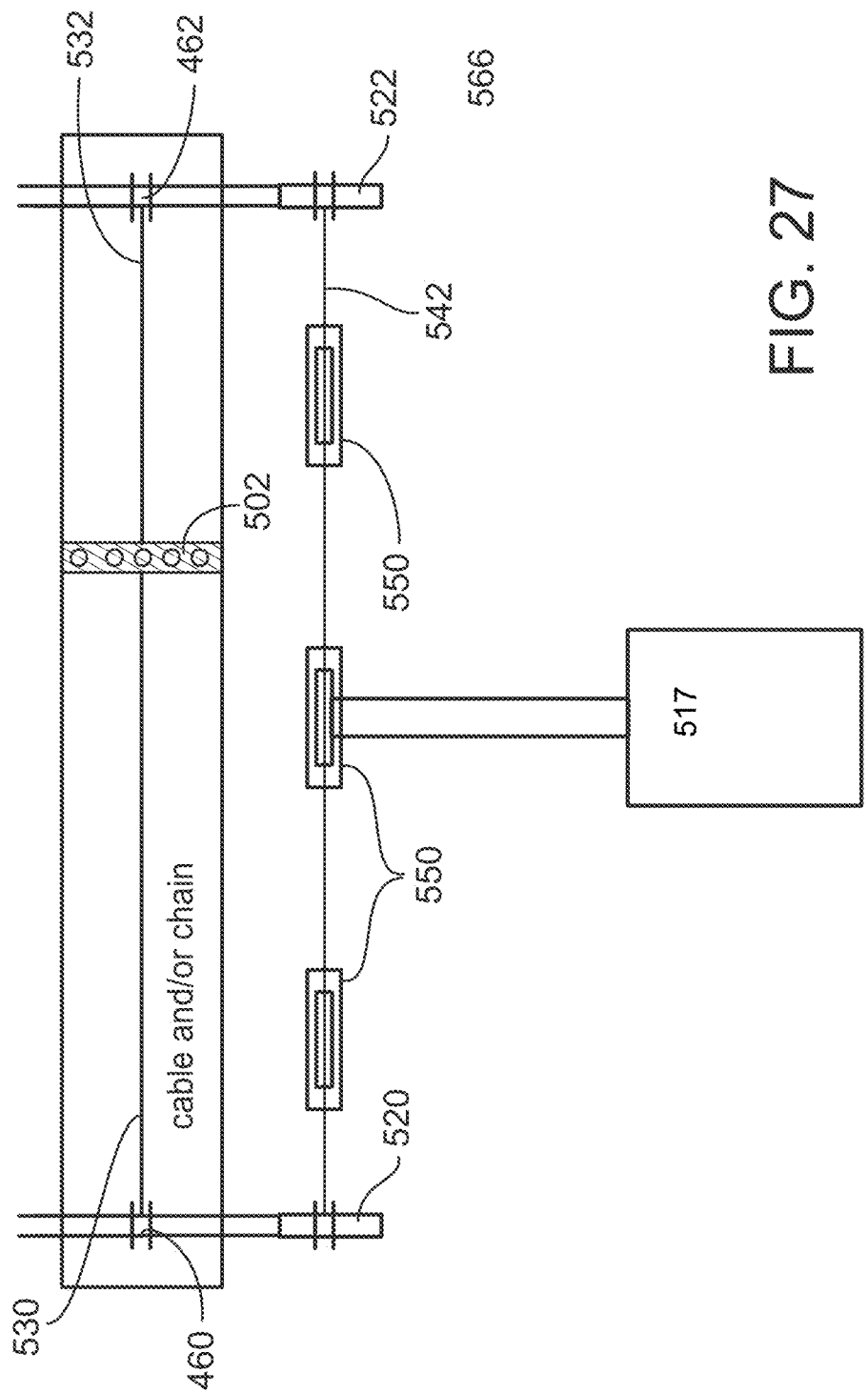
FIG. 27 is a schematic view of a further embodiment of the invention.

Referring now to FIG. 27, an embodiment is shown utilizing only a single motor 517. This single motor 517 may use appropriate gearbox to control cable 542 which is supported by fair leads 550. Cable 542 in turn is operably connected to drive shafts 520, 522 which transfer movement to cables 530, 532 in order to reciprocate the push plate 502.

In the various embodiments disclosed in this application, the term "cable" has been used as a generic term describing an elongate structural strand by which the push plates are moved within and exterior to the pressure vessel. The term "cable" is meant to describe any strand suitable and capable of functioning as described, for example, wire rope cables of various designs, synthetic rope, link chains, sprocket chains and chains driven without sprockets. Those of skill in the art will be familiar with well-known formulas for determining cable capacities under a given set of requirements.

Similarly, the term "motor" has been used as a generic term describing any one of a number of prime movers having sufficient speed control and torque to move the push plates disclosed in this application within the pressure vessels. Such motors include but are not limited to hydraulic radial piston motors, electric motors and air motors. Hydraulic radial piston motors are believed to be particularly suitable due to a wide range of sizes, speeds and torques available. Radial piston motors are characterized by the ability to operate at low speeds while generating very high torque. Hydraulic radial piston motors manufactured by Hägglund are considered to be particularly suitable because of the availability of full torque throughout the motor's speed range, full control of speed and torque, direct drive design and compact size for the amount of torque available. Those of skill in the art will be familiar with well-known formulas for determining motor capacities under a give set of requirements.

Pumped storage water electric power generation facilities according to several embodiments are disclosed. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A method for generating electricity in pumped water storage facility, comprising:
   introducing water, from a water source, using at least one water-feed line, into a pressure vessel;
   controlling the introduction of water into the pressure vessel, wherein controlling the introduction of water into the pressure vessel comprises:
   the use of water flow valves for communicating with the pressure vessel,
   discharging, using a water-discharge line, from the pressure vessel, water under pressure downstream to a hydroelectric turbine;
   reciprocating a push plate linearly, using a single motor operatively coupled to the push plate, between a first direction wherein water is drawn into the pressure vessel through the water flow valves and a second direction wherein water is conveyed downstream through the water discharge line under pressure to the hydroelectric turbine;
   feeding water gravitationally, using a feed water penstock, from an upper reservoir to and through a power house that includes the hydroelectric turbine and into a lower reservoir;
   wherein the upper reservoir and the lower reservoir are contained in respective upper and lower impoundments constructed of encapsulated CCR, reinforced CCR slopes, and a covering of vegetation.

2. The method for generating electricity in a pumped water storage facility according to claim 1, further comprising:
   returning the water to the upper reservoir for recirculation to the feed water penstock, thereby defining a closed loop pumped storage electricity generating system.

3. The method for generating electricity in pumped water storage facility according to claim 1, wherein the pressure vessel is adapted to work in an open loop, continuous cyclical manner during hydroelectric power generation.

4. The method for generating electricity in a pumped water storage facility according to claim 1, wherein the at least one water feed line is lower in elevation than the water source and located at a higher elevation than the hydroelectric turbine.

5. The method for generating electricity in a pumped water storage facility according to claim 1, wherein a plurality of pressure vessels are positioned in a parallel/side-by-side array and operatively sequenced wherein water is conveyed continuously downstream through the water discharge line under pressure to the hydroelectric turbine.

6. The method for generating electricity in a pumped water storage facility according to claim 1, wherein the upper and lower impoundments each include a base lined with an impervious liner and the reinforced CCR slopes are protected and reinforced by a roller compacted concrete berm encircling the respective upper and lower reservoirs.

7. The method for generating electricity in a pumped water storage facility according to claim 1, wherein the single motor is selected from the group consisting of a hydraulic piston motor, electric motor and air motor.

8. The method for generating electricity in a pumped water storage facility according to claim 1, wherein the single motor is a radial piston motors.

9. The method for generating electricity in a pumped water storage facility according to claim 1, wherein reciprocating the push plate is facilitated by a compartment, within the push plate, in which a bogie carrying a wheel set configured to engage a pair of parallel rails on which the bogie is positioned within the pressure vessel.

10. A method for generating electricity in pumped water storage facility, comprising:
introducing water, from a water source, using at least one water-feed line, into a pressure vessel;
controlling the introduction of water into the pressure vessel, wherein controlling the introduction of water into the pressure vessel comprises:
the use of water flow valves for communicating with the pressure vessel,
discharging, using a water-discharge line, from the pressure vessel, water under pressure downstream to a hydroelectric turbine; and
reciprocating a push plate linearly, using a single motor operatively coupled to the push plate, between a first direction wherein water is drawn into the pressure vessel through the water flow valves and a second direction wherein water is conveyed downstream through the water discharge line under pressure to the hydroelectric turbine;
wherein reciprocating the push plate is facilitated by a compartment, within the push plate, in which a bogie carrying a wheel set configured to engage a pair of parallel rails on which the bogie is positioned within the pressure vessel.

11. The method for generating electricity in a pumped water storage facility according to claim 10, further comprising feeding water gravitationally, using a feed water penstock, from an upper reservoir to and through a power house that includes the hydroelectric turbine and into a lower reservoir.

12. The method for generating electricity in a pumped water storage facility according to claim 10, further comprising:
feeding water gravitationally, using a feed water penstock, from an upper reservoir to and through a power house that includes the hydroelectric turbine and into a lower reservoir; and
returning the water to the upper reservoir for recirculation to the feed water penstock, thereby defining a closed loop pumped storage electricity generating system.

13. The method for generating electricity in pumped water storage facility according to claim 10, wherein the pressure vessel is adapted to work in an open loop, continuous cyclical manner during hydroelectric power generation.

14. The method for generating electricity in a pumped water storage facility according to claim 10, wherein the at least one water feed line is lower in elevation than the water source and located at a higher elevation than the hydroelectric turbine.

15. The method for generating electricity in a pumped water storage facility according to claim 10, wherein a plurality of pressure vessels are positioned in a parallel/side-by-side array and operatively sequenced wherein water is conveyed continuously downstream through the water discharge line under pressure to the hydroelectric turbine.

16. The method for generating electricity in a pumped water storage facility according to claim 10, wherein the upper reservoir and the lower reservoir are contained in respective upper and lower impoundments constructed of encapsulated CCR, reinforced CCR slopes, and a covering of vegetation.

17. The method for generating electricity in a pumped water storage facility according to claim 16, wherein the upper and lower impoundments each include a base lined with an impervious liner and the reinforced CCR slopes are protected and reinforced by a roller compacted concrete berm encircling the respective upper and lower reservoirs.

18. The method for generating electricity in a pumped water storage facility according to claim 10, wherein the single motor is selected from the group consisting of a hydraulic piston motor, electric motor and air motor.

19. The method for generating electricity in a pumped water storage facility according to claim 10, wherein the single motor is a radial piston motors.

* * * * *